(12) United States Patent
Liu et al.

(10) Patent No.: US 10,288,740 B2
(45) Date of Patent: May 14, 2019

(54) POSITION TRACKING METHOD AND APPARATUS

(71) Applicant: COMMONWEALTH SCIENTIFIC AND INDUSTRIAL RESEARCH ORGANISATION, Acton (AU)

(72) Inventors: Jiajun Liu, Acton (AU); Philipp Sommer, Acton (AU); Kun Zhao, Acton (AU); Branislav Kusy, Acton (AU); Raja Jurdak, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 262 days.

(21) Appl. No.: 15/301,149

(22) PCT Filed: Apr. 2, 2015

(86) PCT No.: PCT/AU2015/050150
§ 371 (c)(1),
(2) Date: Sep. 30, 2016

(87) PCT Pub. No.: WO2015/149132
PCT Pub. Date: Oct. 8, 2015

(65) Prior Publication Data
US 2017/0016993 A1    Jan. 19, 2017

(30) Foreign Application Priority Data

Apr. 4, 2014   (AU) ................................ 2014901230

(51) Int. Cl.
*G01S 19/14*   (2010.01)
*G01S 19/34*   (2010.01)

(52) U.S. Cl.
CPC .............. *G01S 19/14* (2013.01); *G01S 19/34* (2013.01)

(58) Field of Classification Search
CPC .......... G01S 19/14; G01S 19/34; G01S 19/35; G01S 5/0027; G01S 2205/002
(Continued)

(56) References Cited

U.S. PATENT DOCUMENTS 7,359,713 B1    4/2008  Tiwari
8,385,986 B2 *  2/2013  Kim .................. H04M 1/72522
                                              455/574

(Continued)

FOREIGN PATENT DOCUMENTS

WO    WO2009135191    11/2009

OTHER PUBLICATIONS

D. Westcott et al. The spectacled flying-fox, pteropus conspicillatus, in the context of the world heritage values of the wet tropics world heritage area, Jun. 2001.
(Continued)

*Primary Examiner* — Harry K Liu
(74) *Attorney, Agent, or Firm* — Harness, Dickey & Pierce, P.L.C.

(57) ABSTRACT

A portable position tracking apparatus including a power supply, a position sensor that receives signals and uses the signals to determine an absolute position of the apparatus, a trigger sensor that detects a trigger, and an electronic processing device in communication with the position and trigger sensor that monitors the power supply to determine an available power, determines the trigger in response to a signal from the trigger sensor, in response to detection of the trigger, uses the available power to control operation of the position sensor to thereby selectively determine the absolute position, and stores an indication of a position of the apparatus in a memory at least partially in accordance an absolute position.

18 Claims, 20 Drawing Sheets
(11 of 20 Drawing Sheet(s) Filed in Color)

(58) Field of Classification Search
USPC .................................................. 342/357.52
See application file for complete search history.

(56) References Cited

U.S. PATENT DOCUMENTS

| | | | |
|---|---|---|---|
| 8,497,774 B2 | 7/2013 | Scalisi et al. | |
| 2001/0048364 A1 | 12/2001 | Kalthoff et al. | |
| 2005/0046580 A1* | 3/2005 | Miranda-Knapp | G08B 13/1418 340/686.1 |
| 2007/0096676 A1* | 5/2007 | Im | G05D 1/0225 318/587 |
| 2009/0066569 A1 | 3/2009 | Hunter et al. | |
| 2010/0188245 A1* | 7/2010 | Nielsen | G01V 3/08 340/686.1 |
| 2010/0194632 A1 | 8/2010 | Raento et al. | |
| 2012/0206296 A1 | 8/2012 | Wan | |
| 2012/0299721 A1* | 11/2012 | Jones | B60R 25/33 340/521 |
| 2013/0238700 A1* | 9/2013 | Papakipos | G06F 21/81 709/204 |
| 2015/0179045 A1* | 6/2015 | Stevens | H04W 4/029 340/539.13 |
| 2015/0257103 A1* | 9/2015 | Detter | H04W 52/0225 370/241 |

OTHER PUBLICATIONS

McKeown and D. Westcott, Assessing the accuracy of small satellite transmitters on free-living flying-foxes, Australian Ecology, 37:295-301, 2012.

R. Jurdak, P. Sommer, B. Kusy, N. Kottege, C. Crossman, A. Mck-eown, and D. Westcott. Camazotz: Multimodal Activity-based GPS Sampling. In *Proceedings of the 12th international conference on In-formation processing in sensor networks (IPSN)*, pp. 67-78, 2013.

International Search Report and Written Opinion of the ISA for PCT/AU2015/050150, ISA/AU, Woden ACT, dated May 8, 2015.

* cited by examiner

POSITION TRACKING METHOD AND APPARATUS

CROSS-REFERENCE TO RELATED APPLICATIONS

This application is a 371 U.S. National Stage of International Application No. PCT/AU2015/050150, filed Apr. 2, 2015, which claims the benefit of and priority to Australian Patent Application No. 2014901230, filed Apr. 4, 2014. The disclosures of the above applications are incorporated herein by reference.

BACKGROUND OF THE INVENTION

The present invention relates to a position tracking method and apparatus.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In some circumstances, it is desirable to track the position and/or movement of an object, for example an animal, or the like. In this regard, it is known to tag animals with GPS enabled tracking devices. However such devices can suffer from a number of drawbacks. In this regard, the power usage of GPS systems is relatively high so it is necessary to limit the sampling rate to extend battery life. However, limiting the sampling rate may provide insufficient measurements to produce an accurate representation of the animal's movements. Alternatively, the tags may incorporate a larger battery, however typically this makes the device impractical, particularly on animals which move large distances over prolonged periods of time. Thus, in such situations GPS sampling becomes a trade-off between excessive power consumption and a loss in accuracy of the recorded position.

SUMMARY OF THE PRESENT INVENTION

The present invention seeks to ameliorate one or more of the problems associated with the prior art.

In a first broad form the present invention seeks to provide a portable position tracking apparatus including:
  a) a power supply;
  b) a position sensor that receives signals and uses the signals to determine an absolute position of the apparatus;
  c) a trigger sensor that detects a trigger; and,
  d) an electronic processing device in communication with the position and trigger sensor that:
    i) monitors the power supply to determine an available power;
    ii) determines the trigger in response to a signal from the trigger sensor;
    iii) in response to detection of the trigger, uses the available power to determine if an absolute position should be sampled;
    iv) if the absolute position should be sampled, controls operation of the position sensor to thereby determine the absolute position; and,
    v) stores an indication of a position of the apparatus in a memory in accordance with the absolute position.

Typically, the trigger includes at least one of:
  a) a threshold is exceeded;
  b) a change in movement of the apparatus;
  c) a change in a temperature;
  d) a change in a pressure;
  e) a change in a humidity;
  f) a change in an illumination;
  g) a change in a proximity of the apparatus to an object; and
  h) a change in a sound.

Typically, the trigger sensor includes at least one of:
  a) a motion sensor;
  b) a gyroscope;
  c) an accelerometer;
  d) a magnetometer;
  e) a thermometer;
  f) a barometer;
  g) a hygrometer;
  h) a photodetector;
  i) a proximity sensor; and,
  j) a microphone.

Typically, the electronic processing device:
  a) determines a relative position of the apparatus based on movement of the apparatus from the most recent absolute position; and,
  b) stores an indication of the relative position.

Typically, the electronic processing device:
  a) detects movement of the apparatus using a motion sensor;
  b) estimates trip duration using historical position tracking data; and,
  c) selects a sampling strategy using the estimated trip duration and available power.

Typically, the sampling strategy includes at least one of:
  a) an inertial based strategy;
  b) an inertial and time based strategy; and,
  c) an error based strategy.

Typically, the electronic processing device:
  a) compares the movement to movement criteria; and,
  b) selectively determines the absolute position from the position sensor in accordance with the results of the comparison.

Typically, the movement criteria include at least one of if:
  a) the apparatus changes from a stationary to a moving state;
  b) a cumulative heading change exceeds a defined heading change threshold; and,
  c) an orthogonal distance exceeds an orthogonal distance threshold.

Typically, the electronic processing device:
  a) uses the movement to determine a potential error;
  b) compares the potential error to an error threshold; and,
  c) controls the position sensor in accordance with the result of the comparison.

Typically, the electronic processing device:
  a) monitors at least one of power usage and trip complexity;
  b) estimate a power consumption;
  c) determines if expectations are exceeded by comparing the power consumption to the available power; and,
  d) revises a sampling strategy in response to a successful determination.

Typically, the electronic processing device:
e) compares an elapsed time since the absolute position was previously determined to an elapsed time threshold; and,
f) selectively determines the absolute position from the position sensor in accordance with the results of the comparison.

Typically, the electronic processing device sets a threshold based on the available power.

Typically, the electronic processing device determines available power at least partially in accordance with a power supply input and power supply output.

Typically, the power supply input is coupled to a power generator that generates electrical power from external energy sources.

Typically, the external energy sources include at least one of:
a) movement of the apparatus; and,
b) solar power.

Typically, the power supply includes a battery and wherein the electronic processing device determines the available power at least partially in accordance with a battery charge level.

Typically, the electronic processing device controls the position sensor at least partially in accordance with a schedule stored in a memory.

Typically, the schedule is at least one of:
a) a movement schedule indicative of an expected duration of movement; and,
b) a power schedule indicative of an expected available power.

Typically, the schedule is based upon previous measurements of at least one of movement and power usage.

Typically, the schedule is remotely updated.

Typically, the power schedule is at least partially indicative of at least one of:
a) expected power generation; and,
b) expected power usage.

Typically, the electronic processing device controls the position sensor to cause the absolute position to be determined at a predetermined frequency.

Typically, the position sensor includes a GPS system.

Typically, the apparatus includes a transceiver that communicates with one or more communication nodes to provide position information indicative of one or more positions of the apparatus.

In a second broad form the present invention seeks to provide a method for tracking a position of an object, the method including, in an electronic processing device of a position tracking apparatus attached to the object:
g) monitoring a power supply to determine an available power;
h) determining a trigger in response to a signal from a trigger sensor;
i) in response to detection of the trigger, using the available power determine if an absolute position should be sampled;
j) if the absolute position should be sampled, controlling operation of a position sensor to thereby determine an absolute position; and,
k) storing an indication of a position of the apparatus in a memory in accordance with the absolute position.

Typically, the trigger includes at least one of:
a) a threshold is exceeded;
b) a change in movement of the apparatus;
c) a change in a temperature;
d) a change in a pressure;
e) a change in a humidity;
f) a change in an illumination;
g) a change in a proximity of the apparatus to an object; and
h) a change in a sound.

Typically, the method includes:
a) determining a relative position of the object based on movement of the object from the most recent absolute position; and,
b) storing an indication of the relative position.

Typically, the method includes:
a) detecting movement of the object using a motion sensor;
b) estimating trip duration using historical position tracking data; and,
c) selecting a sampling strategy using the estimated trip duration and available power.

Typically, the sampling strategy includes at least one of:
a) an inertial based strategy;
b) an inertial and time based strategy; and,
c) an error based strategy.

Typically, the method includes:
l) comparing the movement to movement criteria; and,
m) selectively determining the absolute position from the position sensor in accordance with the results of the comparison.

Typically, the movement criteria include at least one of if:
a) the object changes from a stationary to a moving state;
b) a cumulative heading change exceeds a defined heading change threshold; and,
c) an orthogonal distance exceeds an orthogonal distance threshold.

Typically, the method includes:
a) using the movement to determine a potential error;
b) comparing the potential error to an error threshold; and,
c) controlling the position sensor in accordance with the result of the comparison.

Typically, the method includes:
a) monitoring at least one of power usage and trip complexity;
b) determining if expectations are exceeded; and,
c) revising a sampling strategy in response to a successful determination.

Typically, the method includes:
a) comparing an elapsed time since the absolute position was previously determined to an elapsed time threshold; and,
b) selectively determining the absolute position from the position sensor at least partially in accordance with the results of the comparison.

Typically, the method includes setting a threshold based on the available power.

Typically, the method includes determining available power at least partially in accordance with a power supply input and power supply output.

Typically, the method includes determining the available power at least partially in accordance with a batter charge level.

Typically, the method includes controlling the position sensor at least partially in accordance with a schedule store in a memory.

Typically, the schedule is at least one of:
a) a movement schedule indicative of an expected duration of movement; and,
b) a power schedule indicative of an expected available power.

Typically, the schedule is based upon previous measurements of at least one of movement and power usage.

Typically, the method includes remotely updating the schedule.

Typically, the power schedule is at least partially indicative of at least one of:
  a) expected power generation; and,
  b) expected power usage.

Typically, the method includes controlling the position sensor to cause the absolute position to be determined at a predetermined frequency.

Typically, the position sensor includes a GPS system.

Typically, the method includes communicating with one or more communication nodes to provide position information indicative of one or more positions of the object.

In a third broad form the present invention seeks to provide a portable position tracking apparatus including:
  n) a power supply;
  o) a position sensor that receives signals and uses the signals to determine an absolute position of the apparatus;
  p) a trigger sensor that detects a trigger; and,
  q) an electronic processing device in communication with the position and motion sensors that:
    i) determines the trigger in response to a signal from the trigger sensor;
    ii) retrieving information derived from historical position tracking data including historical measurements performed on a same object;
    i) in response to detection of the trigger, uses information derived from historical position tracking data to determine if an absolute position should be sampled;
    iii) if the absolute position should be sampled, controls operation of the position sensor to thereby determine the absolute position; and,
    iv) stores an indication of a position of the apparatus in a memory in accordance with the absolute position.

In a fourth broad form the present invention seeks to provide a method for tracking a position of an object, the method including, in an electronic processing device of a position tracking apparatus attached to the object:
  a) determining a trigger in response to a signal from a trigger sensor;
  b) in response to detection of the trigger, using information derived from historical position tracking data to control operation of a position sensor to thereby selectively determine an absolute position; and,
  c) storing an indication of a position of the apparatus in a store at least partially in accordance with an absolute position.

In a fifth broad form the present invention seeks to provide a portable position tracking apparatus including:
  a) a power supply;
  b) a position sensor that receives signals and uses the signals to determine an absolute position of the apparatus; and,
  c) an electronic processing device in communication with the position and motion sensors that:
    i) monitors the power supply to determine an available power;
    i)ii) retrieving information derived from historical position tracking data including historical measurements performed on a same object;
    iii) uses information derived from historical position tracking data and the available power to determine if an absolute position should be sampled;
    ii)iv) if the absolute position should be sampled, controls operation of the position sensor to thereby selectively determine the absolute position; and,
    iii)v) stores an indication of a position of the apparatus in a store memory at least partially in accordance with an the absolute position.

In a sixth broad form the present invention seeks to provide a method for tracking a position of an object, the method including, in an electronic processing device of a position tracking apparatus attached to the object:
  r) monitoring a power supply to determine an available power;
  s) using information derived from historical position tracking data and the available power to control operation of a position sensor to thereby selectively determine an absolute position; and,
  t) storing an indication of a position of the apparatus in a memory at least partially in accordance with an absolute position.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

An example of the present invention will now be described with reference to the accompanying drawings, in which:—

DETAILED DESCRIPTION OF THE PREFERRED EMBODIMENTS

Figure 1:
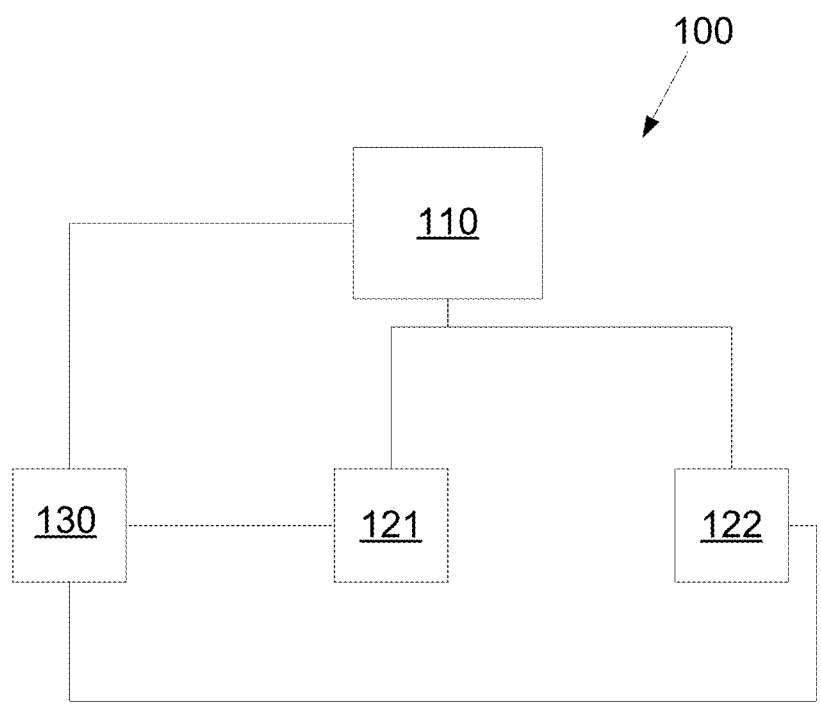
FIG. 1 is a schematic diagram of a first example of a portable position tracking apparatus.

An example of a portable position tracking apparatus and a method for determining a position of an object will now be described with reference to FIGS. 1 to 4.

In this example, the apparatus 100 includes a power supply 130, and a position sensor 121 that receives signals and uses the signals to determine an absolute position of the apparatus 100. The apparatus 100 in this example includes a trigger sensor 122 that detects a trigger, however a trigger sensor 122 is optional and this will be discussed further below. Furthermore, the apparatus 100 includes an electronic processing device 110 in communication with the position and trigger sensor 121, 122.

Figure 2:
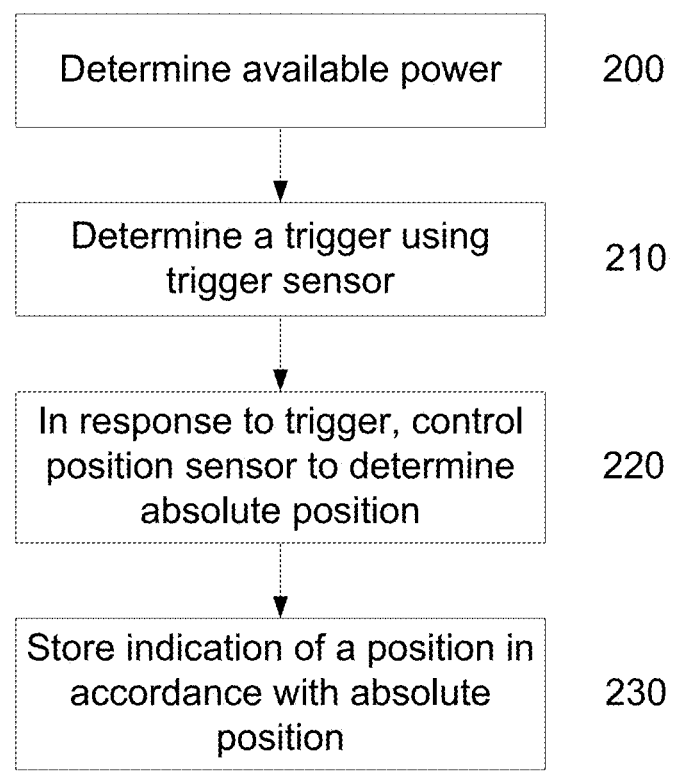
FIG. 2 is a flowchart of a first example of a method for determining a position of an object.

In this regard, the apparatus 100 may be used to perform a method for determining a position of an object, and a first example of a suitable method is provided in FIG. 2.

In this example, the method includes in the electronic processing device 110 of a position tracking apparatus 100 attached to the object, at step 200, monitoring the power supply 130 to determine an available power. At step 210, the method includes determining a trigger in response to one or more signals from the trigger sensor 122. In response to detection of a trigger, the method includes at step 220 using the available power to control operation of the position sensor 121 to thereby selectively determine an absolute position. The method further includes, at step 230, storing an indication of a position of the apparatus 100 in a memory in accordance an absolute position.

Thus, the above described method may be used to allow selective sampling of the absolute position in response to the trigger and based upon the available power of the apparatus.

Figure 3:
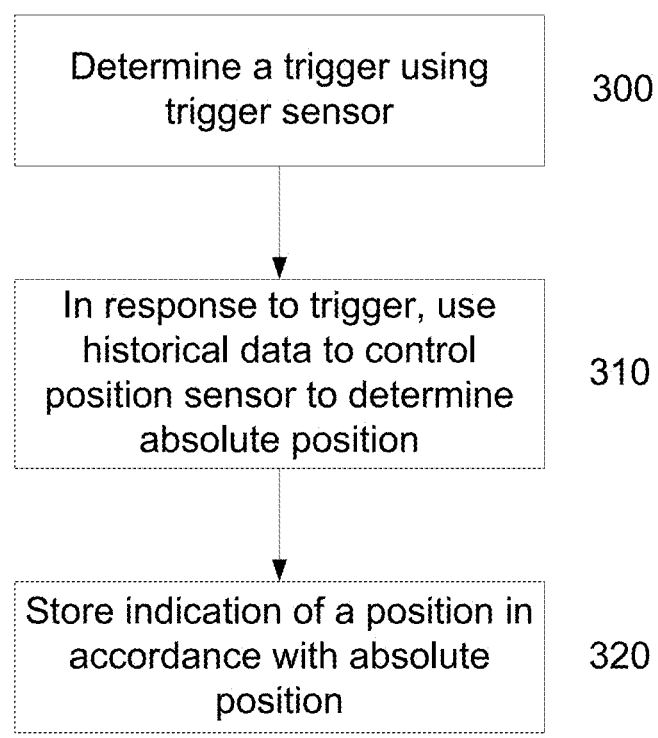
FIG. 3 is a flowchart of a further example of a method for determining a position of an object.

In an additional/alternative example, shown in FIG. 3, the method includes in the electronic processing device 110, at step 300, determining a trigger in response to one or more signals from the trigger sensor 122. At step 310, in response to detection of the trigger, the method includes using information derived from historical position tracking data to control operation of a position sensor 121 to thereby selectively determine an absolute position. At step 320, the method includes storing an indication of a position of the apparatus 100 in a memory at least partially in accordance with an absolute position.

Hence in this example, the control of the position sensor 122 is performed in response to a trigger event and based upon historical position tracking data.

Figure 4:
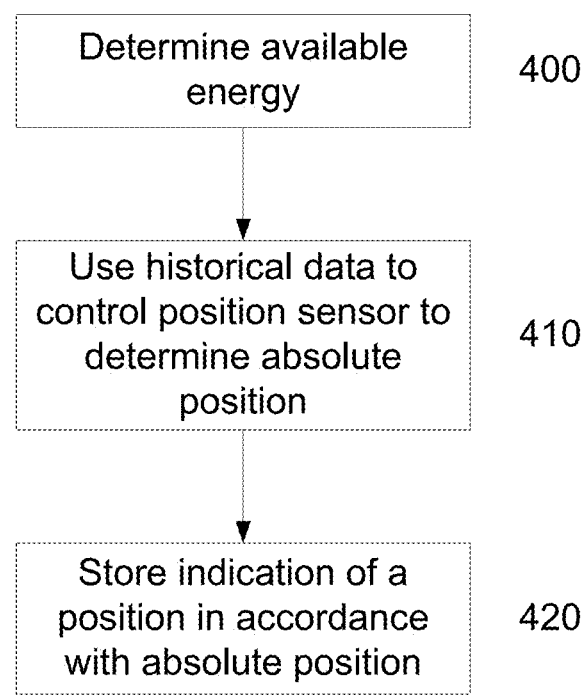
FIG. 4 is a flowchart of a further example of a method for determining a position of an object.

Alternatively, as discussed above, the apparatus 100 may not include or utilise a trigger sensor 122. In one such example, as shown in FIG. 4, the method includes in the electronic processing device 110 at step 400, monitoring the power supply 130 to determine an available power. At step 410, the method includes using information derived from historical position tracking data and the available power to control operation of a position sensor 121 to thereby selectively determine an absolute position. The method includes, at step 420, storing an indication of a position of the apparatus 100 in a memory at least partially in accordance with an absolute position.

Thus, this example may provide for sampling of the absolute position based upon historical position tracking data and available power.

Hence, in general the above methods include similar processes which make use of any two or all three of a trigger, available power and historical position tracking data in controlling the position sensor to selectively determine an absolute position.

The described methods and apparatus offer a number of advantages over existing techniques.

In particular, the methods described above use a combination of a trigger, available power and historical position tracking data to selectively sample the absolute position, thereby maximising the effectiveness of the sampling.

In this regard, performing absolute position sampling based upon a trigger is beneficial as it allows sampling of the position sensor 121 to be avoided or minimised during periods where the absolute position not typically required. For example, in the event the apparatus 100 is used in tracking a foraging animal, it may not be necessary to sample an absolute position while the animals is not moving and/or not commuting, foraging, or the like. Therefore, by sampling the absolute position in response to a trigger, such as the animal changing from stationary to moving, the position sensor 121 can be used primarily in periods of interest and/or where the animal's position is likely to significantly change.

In respect of controlling the position sensor 121 in accordance with available power, this allows factors such as available battery power, energy harvesting and/or scavenging, and/or solar power to be taken into account when sampling absolute position. For example, this may allow sampling to be performed at a maximum frequency within the limits of the available power.

Use of historical position tracking data is also beneficial, as it may allow sampling to be tailored according to historical measurements performed on the same object, on a population of the same or similar objects, or any other suitable object or population thereof. For example, when tracking a foraging animal, historical measurements taken in respect of a population of similar foraging animals may show that a majority of movement occurs during nocturnal hours. Thus, sampling of the absolute position may be maximised during hours of darkness, and minimised or foregone during daylight hours, in order to increase the effectiveness of the recorded samples.

Whilst any one of a trigger, available power and historical position tracking data may be used alone, such arrangement have not proven to be particularly successful. However, controlling the position sensor 121 in accordance with any two or more of the trigger, available power and historical position tracking data provides significant enhancement to the effectiveness of absolute position sampling.

In respect of the example of FIG. 3, the method also allows for the selective sampling of the absolute position based upon a trigger event and using historical position tracking data. Hence, where available power is limited, this method also provides an arrangement for intelligently limiting the sampling of absolute positions to thus ensure the accuracy of the stored position without excessive sampling of the absolute position.

Furthermore, in some examples it may desirable to use a trigger, available power and historical position tracking data in controlling the position sensor to selectively determine an absolute position. In this regard, using a combination of all three steps in order to control the position sensor allows for increased accuracy in the stored position, while also ensuring power consumption remains within available limits.

A number of further features will now be described.

In the above examples, the apparatus 100 includes the electronic processing device 110, and in this regard the electronic processing device may include any suitable device such as a microprocessor, microchip processor, logic gate configuration, firmware optionally associated with implementing logic such as an FPGA (Field Programmable Gate Array).

In one example, the electronic processing device 110 forms part of a processing system. In this regard, a suitable processing system includes the electronic processing device 110, a memory, and an external interface interconnected via a bus. In this example, the external interface is for connecting the processing system to the position and trigger sensors 121, 122, however the external interface can also be utilised for connecting the processing system to peripheral devices, such as a transceiver, communications networks, other storage devices, or the like. Furthermore, in practice multiple external interfaces using various methods (e.g. Ethernet, serial, USB, wireless or the like) may be provided, for example, for connecting the processing system to another processing system when configuring and/or reconfiguring the apparatus 100 before or after deployment in the field.

In use, the electronic processing device 110 executes instructions in the form of applications software stored in memory to perform required processes, such controlling operation of the position sensor 121 to selectively determine the absolute position. Thus, actions performed by a electronic processing device 110 are performed in accordance with instructions in the memory and/or commands received from other processing systems, such as from a central or remote server or communication nodes. The applications software may include one or more software modules, and may be executed in a suitable execution environment, such as an operating system environment, or the like.

It will also be understood that the processing system 110 could be or could include a suitably programmed computer system, PC, Raspberry Pi, or the like, or any other electronic device, system or arrangement, although this is not essential.

In some examples, the trigger includes any one or more of a threshold being exceeded, a change in movement of the apparatus, a change in a temperature, a change in a pressure, a change in a humidity, a change in an external illumination, a change in a proximity of the apparatus to an object, such as another object, and a change in a sound. Thus, the trigger sensor may include any one or more of a motion sensor, a gyroscope, an accelerometer, a magnetometer, a thermometer, a barometer, a hygrometer, a photodetector, a proximity sensor, and a microphone.

In particular, the trigger may be based upon factors which are related to spatial, temporal, environmental, social and/or interactive changes or events. This is advantageous as it facilitates a potentially wide range of triggers for use in controlling the sampling of the absolute position. For example, spatial factors may include movement and/or a change in movement, a location and change thereof, temporal factors may include an elapsed time, a time of day, a time or year, or the like. Additionally, environmental factors, may include temperature, humidity, brightness, illumination, pressure, sounds and the like and social factors may include proximity to other objects, interactions with other objects, or the like.

Thus, in some examples, it may be desirable to track the position of a nocturnal animal, and thus sampling of the absolute position may be influenced by the time of day and/or the sunlight present. Alternatively, when tracking the position of an animal, it may be known that when the animal encounters other similar animals, its location is less likely (or more likely) to change and thus the position sensor may be controlled in accordance with the proximity of the animal to similar animals, or other objects.

In a further example, the method includes, in the electronic processing device 110, determining a relative position of the apparatus 100 based on movement of the apparatus 100 from the most recent absolute position, and storing an indication of the relative position. This is beneficial, as the relative position may provide an approximation or indication of the absolute position, without requiring the position sensor to determine the absolute position, thus at least partially conserving energy.

Additionally or alternatively, the method may include, in the electronic processing device 110, detecting movement of the apparatus 100 using a motion sensor, estimating trip duration using historical position tracking data, and selecting a sampling strategy using the estimated trip duration and available power. This is particularly beneficial as it allows the sampling strategy to be selected based upon the available power and trip duration, which thus allows the electronic processing device 110 to pre-select the strategy which maximises location accuracy by maximising the number of samples of the absolute position which are acquired within the limits of the available power.

In this regard, the sampling strategy may include any suitable strategy. In one example, the sampling strategy includes any one or more of an inertial based strategy, an inertial and time based strategy, and an error based strategy. These strategies will be discussed in further detail below, but it will also be appreciated that other strategies could be used.

In a further example, the method may include, in the electronic processing device 110, comparing the movement to movement criteria, and selectively determining the absolute position from the position sensor 121 at least partially in accordance with the results of the comparison. The movement criteria may include any suitable criteria, such as a heading angle threshold, acceleration threshold, distance or location threshold, or the like. In one example, the movement criteria includes any one or more of if the apparatus changes from a stationary to a moving state, if a cumulative heading change exceeds a defined heading change threshold, and if an orthogonal distance exceeds an orthogonal distance threshold. This will be discussed in further detail below.

In some examples, the method includes, in the electronic processing device 110, using the movement to determine a potential error, comparing the potential error to an error threshold, and controlling the position sensor in accordance with the result of the comparison. In this regard, the potential error may be determined in any suitable manner and, in one example, is based upon a heading angle, speed of previous absolute position samples, and time, and this will be discussed further below.

In a further example, the method includes, in the electronic processing device 110, monitoring at least one of power usage and trip complexity, determining if expectations are exceeded, and revising a sampling strategy in response to a successful determination. Thus, this feature allows the sampling strategy to be adapted in the event that there is higher and/or lower power usage, or trip complexity than anticipated. In this regard, the trip complexity typically includes any one or more of a trip duration, movement changes, or any other factor which may cause the absolute position to be sampled a greater number of times than anticipated. Thus, the sampling strategy and/or the thresholds associated therewith may be dynamically altered to accommodate such unanticipated factors.

In some embodiments, the method may include, in the electronic processing device 110, comparing an elapsed time since the absolute position was previously determined to an elapsed time threshold and selectively determining the absolute position from the position sensor at least partially in accordance with the results of the comparison. In this regard, the elapsed time threshold may include a minimum or maximum threshold, such that the absolute position is therefore only determined if enough time, or too much time, has elapsed since the last sample.

Additionally or alternatively, the method may include, in the electronic processing device 110, setting a threshold based on the available power. In this regard, the threshold may refer to any suitable threshold such as the elapsed time threshold, heading angle threshold, distance thresholds, or other thresholds relating to the selected sampling strategy, or the like. Hence, this allows the thresholds to be set in accordance with the available power, ensuring that accuracy of the recorded position information is maximised in accordance with the available power.

In some examples the method includes, in the electronic processing device 110, determining available power at least partially in accordance with a power supply input and power supply output. For example, the apparatus 100 may optionally include the power supply input being coupled to a power generator that generates electrical power from external energy sources. In this regard, the external energy source may include any suitable source, for example, any one or more of a movement of the apparatus and/or solar power. Thus, the power supply input may include movement of the apparatus, solar power, or any other suitable input. This is advantageous as it allows the apparatus 100 to harvest energy while attached to the object, thus prolonging its use and allowing it to be deployed for prolonged periods, and over large distances.

In some examples, the power supply 130 includes a battery and the electronic processing device 110 determines the available power at least partially in accordance with a battery charge level, and this will be discussed further below. Optionally, the battery may be at least partially charged using the external energy source. This is beneficial as it allows the apparatus 100 to use power from the battery in situations where the external energy source is not available, for example, during the night if solar panels are used, or during stationary periods in the event movement is used as an external energy source.

In a further example, the method may include, in the electronic processing device 110, controlling the position sensor 121 at least partially in accordance with a schedule stored in a memory. In this respect, the schedule may include any suitable schedule, such as any one or more of a movement schedule indicative of an expected duration of movement and a power schedule indicative of an expected available power. In respect of the latter, optionally the power schedule may be at least partially indicative of an expected power generation and/or expected power usage.

In one example, the schedule is based upon previous measurements of at least one of movement and power usage. In this regard, the previous measurements may include or form part of the historical position tracking data.

The schedule can be remotely updated or updated on board. This may be beneficial in reducing the computation performed in the electronic processing device 110 and thus decreasing power consumption of the apparatus 100. The schedule may be remotely updated by any one of a communication node and/or a base station, and this will be described in more detail below.

In a further example, the method may include, in the electronic processing device 110, controlling the position sensor 121 to cause the absolute position to be determined at a predetermined frequency. In this regard, the position sensor 121 may sample the absolute position at regular time intervals. Thus, this may provide a further, low power sampling strategy, or alternatively may be used as part of another sampling strategy.

Typically, the position sensor 121 includes a GPS system, however this is not essential and in other examples the position sensor 121 may include any sensor suitable for determining an absolute position, such as a Global Navigation Satellite System (GLONASS), and the like.

In some embodiments, the apparatus 100 includes a transceiver that communicates with one or more communication nodes to provide position information indicative of one or more positions of the apparatus 100. This arrangement is advantageous as the communication nodes may, in some situations, act as intermediaries/repeaters, further transmitting the position information to a base station. Thus, this typically reduces the power requirements for transmitting from the apparatus 100 to the intermediary communication node, rather than the base station.

Figure 5A:
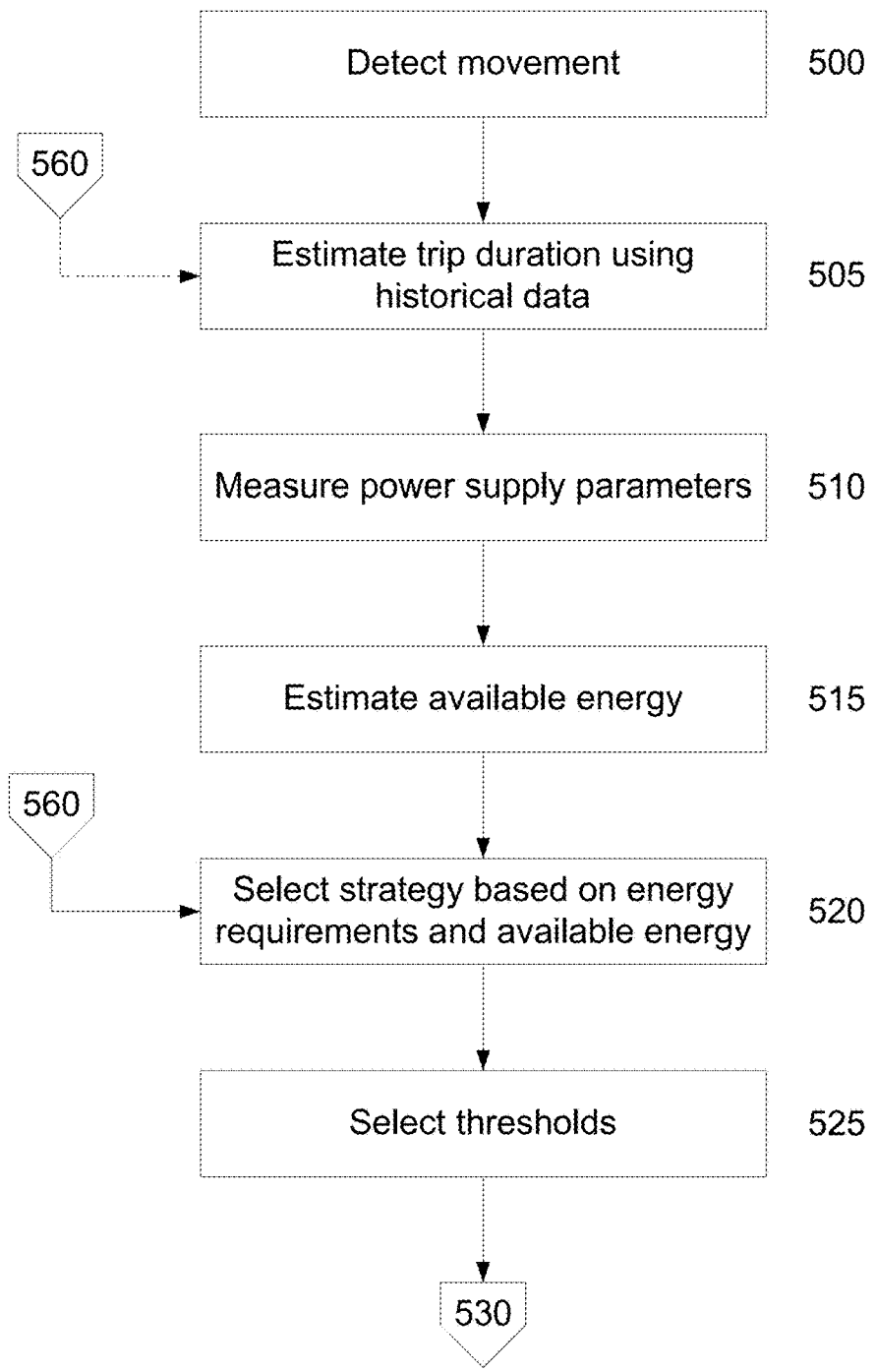
FIG. 5 is a is a flowchart of a further example of a method for determining a position of an object.
Figure 5B:
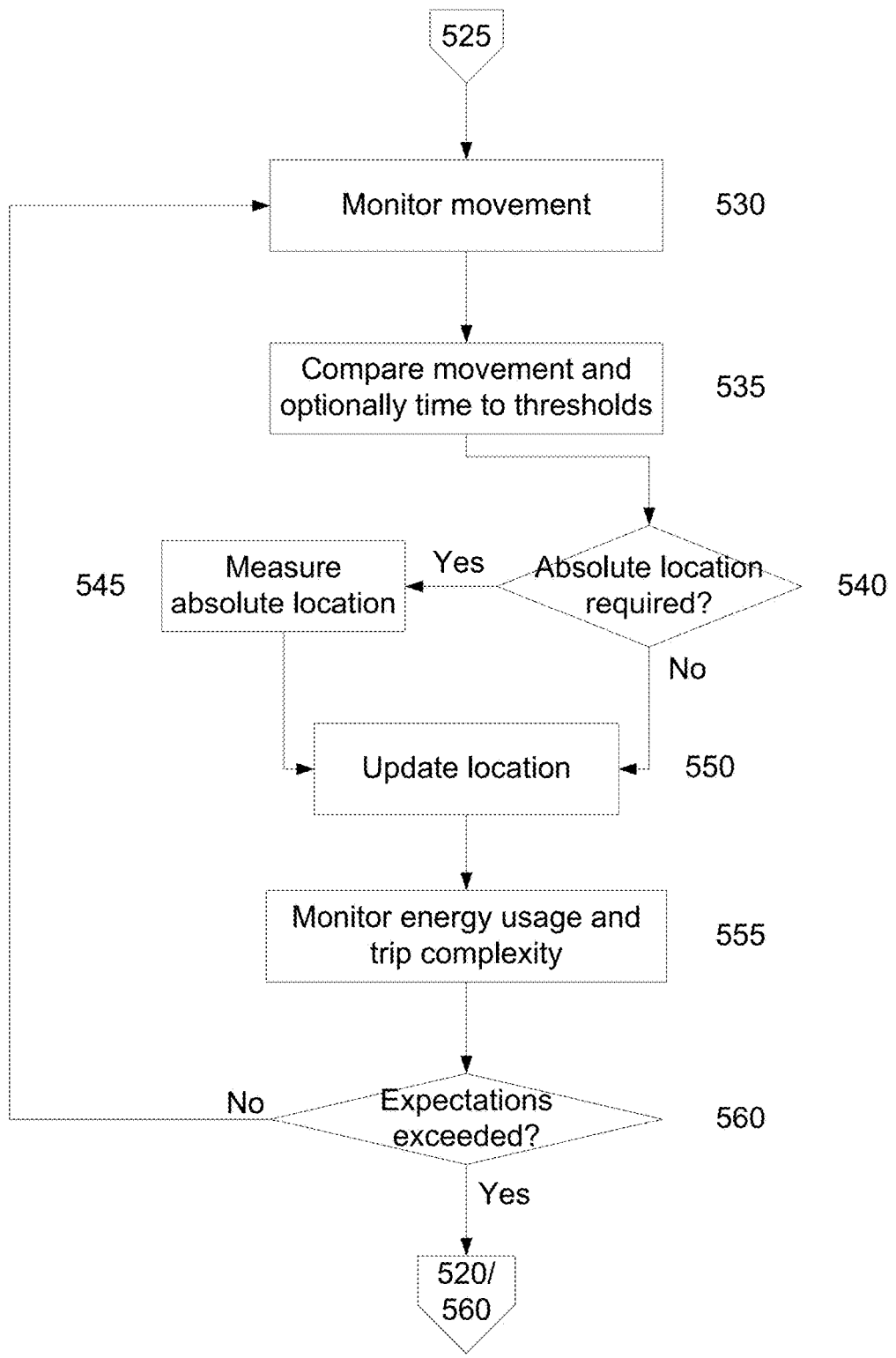

A further example of a method for tracking a position of an object is shown in FIGS. 5A and 5B.

In this example, at step 500, the method includes, in an electronic processing device, detecting movement of a position tracking apparatus attached to the object. This may be performed in any suitable manner, and in some examples includes interpreting signals from inertial sensors, such as an accelerometer and magnetometer. In one particular example, this step includes comparing a change in heading angle and/or a change in acceleration to predetermined thresholds in order to detect whether movement has occurred.

At step 505, the electronic processing device estimates the trip duration using historical position tracking data. A "trip" typically refers to any suitable movement period, and in some examples may refer to a single day and/or night, or may be of greater or lesser duration. Trip duration estimation may be performed in any suitable manner and in the preferred embodiment includes an statistical analysis of previous position measurements taken in respect of the same or similar tracked objects. In any event, this will be discussed in further detail below.

At step 510, the electronic processing device measures power supply parameters. This may include any suitable parameters, such as power generator charge, solar panel charge, battery voltage, and the like. These measurements are subsequently used to estimate the available energy, at step 515, for example for the trip. In this regard, the method may take into account predictions of amounts of energy which may be generated during the trip.

At step 520, a strategy is selected based upon energy requirements and the available energy. "Strategy" typically refers to an absolute position sampling strategy, and may include strategies such as an inertial based strategy, and inertial and time based strategy and an error bounded strategy, as described above. Thus, selection of the strategy may occur in any suitable manner and in one example includes estimating the power consumption of components of the apparatus for each strategy, and selecting the strategy which maximises absolute position sampling, while not exceeding the available power.

At step 525, thresholds are selected in accordance with the selected strategy and the available energy. In this regard, the thresholds may be related to a heading angle threshold, an acceleration threshold, an error threshold, and the like, which, if exceeded, allow the absolute position to be sampled. In addition, the thresholds may refer to sampling parameters, which correspond to different statistical interpretations of the historical position tracking data. For example, an aggressive sampling parameter may correspond to sampling within the selected strategy at a rate which is approximates the average historical sampling rate, whereas a conservative sampling parameter may correspond to sampling at a rate which approximates the maximum historical sampling rate.

At step 530, movement is monitored and typically this is achieved using motion sensors, such as accelerometers, magnetometers and the like. At step 535, movement, and optionally time, is compared to the selected thresholds. Depending upon the strategy used, this may include comparing changes in heading angle, acceleration, orthogonal distance, and optionally whether a predetermined time has elapsed.

In the event the comparisons are successful, an absolute location may be required at step 540, and thus the method would proceed to control the position sensor in order to determine the absolute position at step 545, and the location is subsequently updated at step 550 as the measured absolute location.

In the event an absolute location is not required, for example, if the comparison(s) are unsuccessful, the location may be otherwise determined and updated at step 550. For example, measurements relating to the heading angle, acceleration, and the like may be used to estimate a relative location based upon movement from the last recorded absolute or relative location. Whilst typically this estimation is not as accurate as obtaining an absolute location, it will usually consume less power.

At step 555, the energy usage and trip complexity is monitored during the trip. In this regard, "trip complexity" may refer to the number of absolute position samples taken, which impacts the power consumption, or duration of the trip, or the like.

At step 560, in the event power consumption and/or the number of samples exceeds expectations and/or the estimates expected for the elapsed portion of the trip, the method may proceed back to step 520, and possible select a different strategy, or different parameters. Alternatively, the method may proceed back to step 505 and estimating the remaining trip duration using historical position tracking data.

In the event expectations are not exceeded at step 560, the method continues to monitor movement at step 530 until, for example, a completion of the trip.

Figure 6:
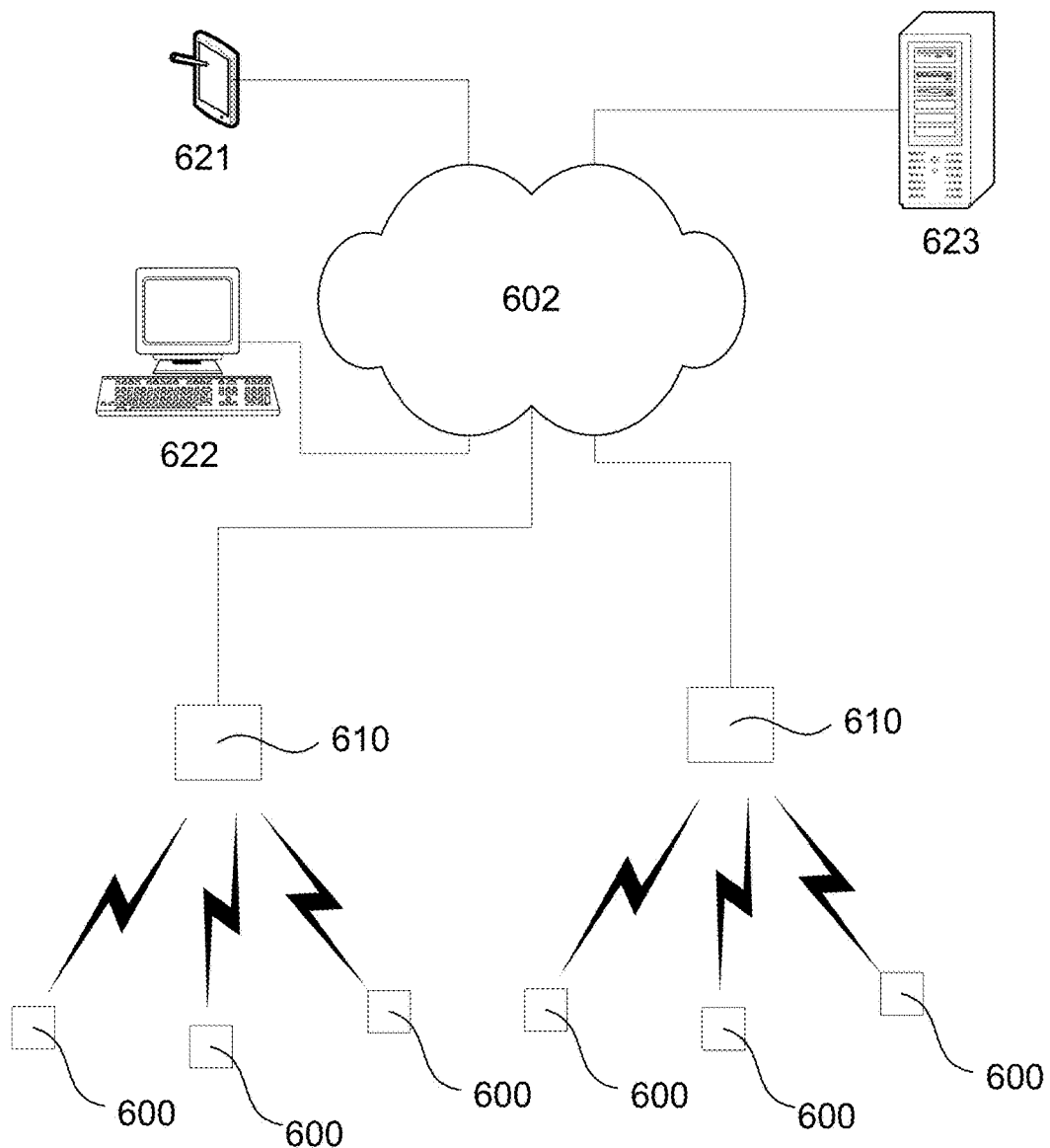
FIG. 6 is a schematic diagram of an examples of a system for determining a position of an object.

An example of a system for tracking a position of an object is shown in FIG. 6. Features similar to those of the example described above have been assigned correspondingly similar reference numerals.

In this example, position tracking apparatus 600 similar to any one of the examples described above, includes a transceiver that communicates with a communication nodes 610 to provide position information indicative of the positions of each of the apparatus 600. In this regard, communication between the apparatus 600 and the communication node 610 is typically wireless. Hence, the communication nodes 610 may be located remotely from the apparatus 600.

This is particularly advantageous as the communication nodes 610 may be periodically positioned in areas frequented by the tracked objects, and thus can provide a mechanism to repeat, enhance, process or analyse position information remote from the apparatus 600, which in turn decreases the power consumption of the apparatus 600. Furthermore, as the communication nodes 610 are typically located nearer the apparatus 600 than a base station, or remote server, or the like, the power required to transmit signals from the apparatus to the communication nodes 610 is typically less. In addition, the communication nodes 610 may include an external energy source for generating power, such as a solar panel, or the like. Communication between the apparatus 600 and communication nodes 610 any suitable wireless communication such as a radio network, mobile phone network, infrared, wifi, or the like.

The communication nodes 610 may subsequently relay data to one or more base stations 621, 622, 623, and this may be via a network, such as the Internet 602, WAN, wifi, mobile phone network, radio network, or the like. This is particularly beneficial as it allows remote users to access and review the position information remotely. Optionally, users may also remotely update any one or more of the strategies, schedules, thresholds, and/or configuration data from the base station 621, 622, 623 via the communication nodes 610.

The communication nodes 610 may also perform additional tasks, such as at least partial processing and analysis of historical position tracking data, and thus it will be appreciated that this may be performed offline and/or batch processed. Thus, this can reduce the computational load on the electronic processing devices of the apparatus 600 which can in turn decrease power consumption. Furthermore, strategies, schedules, thresholds, and/or configuration data and the like may be remotely updated using the communication node 610. Alternatively, similar tasks may be performed on one or more of the base stations, and communicated to the apparatus 600 using the communications nodes 610 as a relay.

However, this arrangement is optional and in other examples position information may be stored on the apparatus 600 and accessed, for example using wired communication, following retrieval of the apparatus 600 from the object.

Figure 7:
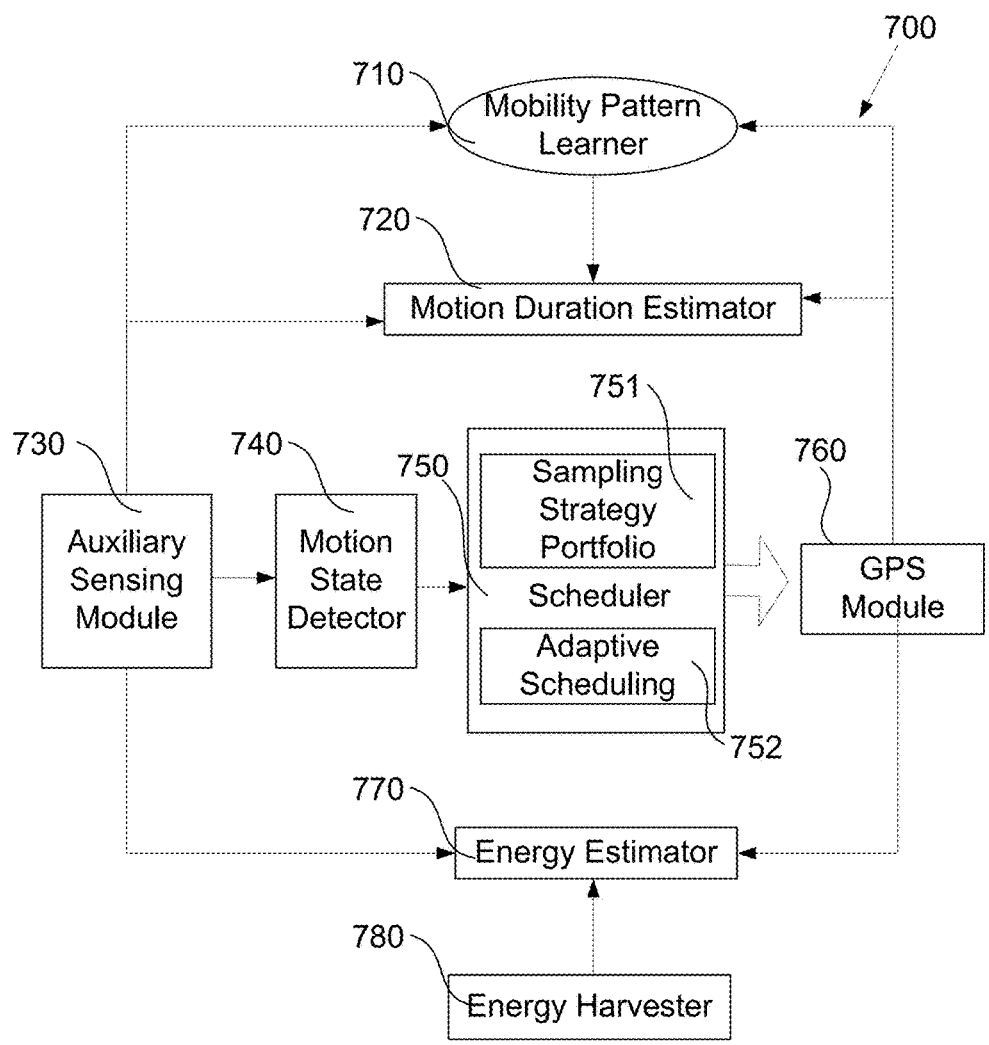
FIG. 7 is a dataflow diagram of a further example of a portable position determining apparatus.

A specific example of dataflow for a further example of a portable position determining apparatus is shown in FIG. 7.

In this example, the apparatus 700 includes an Auxiliary Sensing Module 730 and a GPS Module 760, which are typically hardware modules. The Auxiliary Sensing Module 730 combines a set of very low-energy sensors that provide a Scheduler 750 with real-time background information such as heading information, acceleration, and air pressure. The information obtained by the Auxiliary Sensing Module 730 is fed into the Scheduler 750 to support scheduling decisions.

The GPS Module 760 typically represents the actual GPS receiver that is used to obtain an absolute position from GPS satellites. It is controlled using the Scheduler 750 to determine when to take an absolute position sample. A Motion State Detector 740, Motion Duration Estimator 720 and Energy Estimator 770 are typically software modules, however could also include hardware modules, that take real-time sensory data and historical mobility patterns as input to generate intermediate level information to assist the Scheduler 750 to make decisions on when and how to acquire GPS samples for tracking positions. The Energy Harvester 780 module is typically a hardware module that provides energy to the apparatus by harvesting solar power.

In this example, the work flow of the apparatus 700 includes the Auxiliary Sensing Module 730 updating the ambient sensory information for the tracked object, including but not limited to, acceleration, air pressure, heading information, and the information obtained is accessible from other modules.

Additionally, the Mobility Pattern Learner 710 is typically a software module that determines characteristic mobility information for the tracked object and the population of its kind. Statistics such as speed distribution, step length distribution, trip length/time distribution, frequently visited places, may be extracted and updated from the sensory data obtained by the GPS Module 760 and the Auxiliary Sensing Module 730. The Learner 710 can either be a standalone offline program running on the central server for population-level learning, or on an individual node for individualized learning. The patterns learned are fed into the Motion Duration Estimator 720. Along with real-time information from Motion State Detector 740 and Energy Estimator 770, the Scheduler 750 selects a sampling strategy which maximizes the sample accuracy for the ongoing trip.

The Motion State Detector 740 provides real-time information about the object's mobility. In this example, it detects if the object is stationary or moving, it tracks if the object is moving in a straight line or making a significant turn.

The Motion Duration Estimator 720 estimates expected trip duration. The estimation is made based on the patterns learned and the current background information such as most recent location, current acceleration and turning angles. By matching the current motion states to the historical patterns, the duration of the motion is estimated based upon current conditions. The learning process starts with extracting likely trip duration in a specific time slot for the entire set of tracked objects, then gradually evolves to an individualized estimation by incorporating the individual's travelling habits into the population level model.

The Energy Estimator 770 logs sensor usage during operation and uses a pre-established estimation model to infer the remaining energy. The Scheduler 750 also uses this information as a constraint on approximately how many sampling opportunities there will be during the period of the next estimated trip.

The Scheduler 750 typically selects a strategy from its portfolio for use in the next estimated trip, and in addition may adaptively adjust the scheduling if the trip is longer than expected.

A further specific example of a method and apparatus for use in tracking a position of an object will now be described with reference to FIGS. 8 to 20.

Long-term tracking of small mobile entities and/or objects is a challenging problem with high relevance in ecology, agriculture, and logistics. A significant constraint is energy or power. Accurate tracking requires energy-expensive GPS sampling. The desire to track mobile entities long-term implies that their location is unknown and not readily accessible, which limits opportunities for manually recharging their battery. An alternative approach is to support energy harvesting on tracking devices, such as through solar panels, to replenish energy supplies in situ. With energy harvesting, the available energy budget at any time is subject to the amount of energy that has been harvested in the recent past. Furthermore, decisions to acquire position samples have to be made autonomously by the tracking device.

Motivation: Tracking Flying Foxes

Flying foxes are large bats found in moister tropical habitats from Africa through Asia and into the Pacific and Australia. Also known as fruit bats because of their diet of forest fruits and nectar these animals play an important ecological role as dispersers of pollen and seed. However, they also come into conflict with humans when their roost sites are located in urban areas, because of their raiding of fruit crops and because they are vectors for a range of emerging infectious diseases which have serious consequences for human health, e.g. Hendra virus in Australia, Nipah in Asia and Ebola. Flying-foxes are highly mobile with individuals able to fly 100s of kilometers in a nights foraging. Understanding managing these animals requires an understanding of how they utilize landscapes and their interactions with disease host species animals. This requires a fine-grained understanding of their movement through landscapes. So far, this understanding has been elusive due to the extremely high mobility of these animals (travelling up to 600 km in one night) and their small size (600 g to 1 kg). While mobility limits the options for data recovery, their size limits the weight and size of tracking devices that can be placed on them (see, for example, D. Westcott et al. The spectacled flying-fox, pteropus conspicillatus. Technical report, June 2001, and A. McKeown and D. Westcott. Assessing the accuracy of small satellite transmitters on free-living flying-foxes, *Australian Ecology*, 37:295-301, 2012), in particular the battery capacity of the tracking devices and imposes a very tight energy budget on sensing activities, such as GPS sampling.

Behavioral Patterns.

Figure 8A:
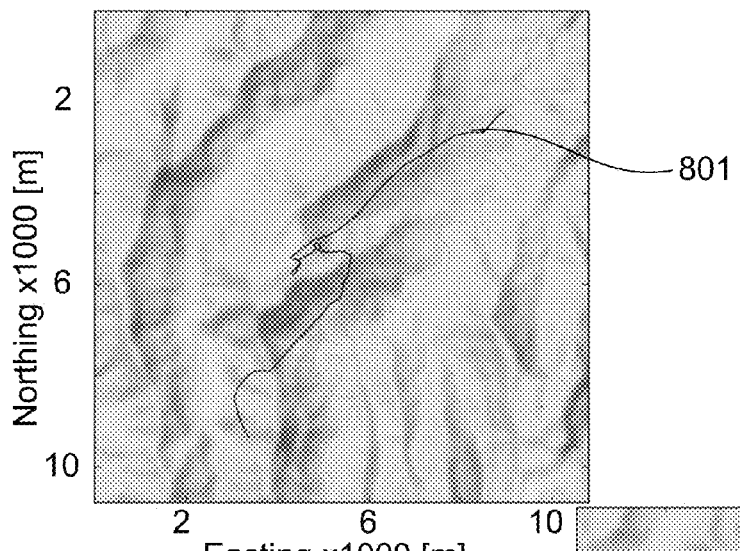
FIGS. 8A to 8C are graphs of examples of GPS sampling of a flight path of a flying fox during one night.
Figure 8B:
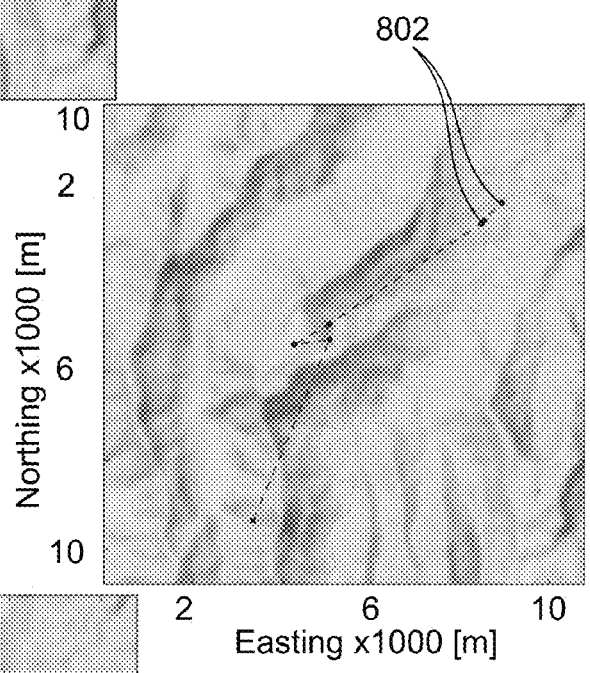
Figure 8C:
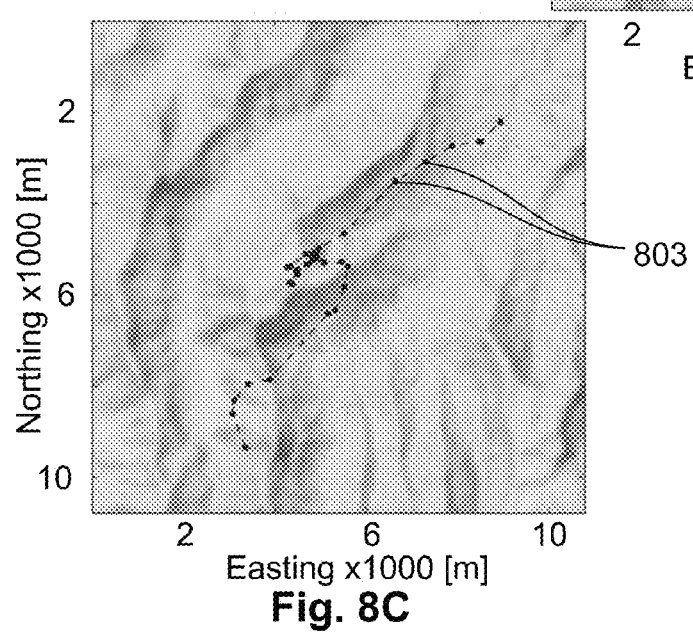

Flying-foxes are nocturnal and during day light rest in large groups at sites called 'camps'. During the day their movements are generally limited to a few movements within the camp (within a radius of about 100-200 meters) and for most of the time they sleep at a single location. On dusk they leave the camp and fly out to forage at sites that are usually 10s of kilometers distant. During the night they may change location several times before returning to the camp before sunrise. The long flying journeys between the camp and the foraging area are called commutes. FIGS. 8A to 8C shows the GPS positions collected by the collar of a single animal while it is flying from the roosting camp towards the foraging area. The movements between camps and foraging sites and the locations at which the animals forage determine how pollen, seeds and disease spread through the landscape and the locations at which animals forage determine the characteristics of the interactions with disease hosts. FIGS. 8A to 8C show the GPS positions collected by the collar of a single animal during one night. In this regard, trace 801 of FIG. 8A shows the position of the flying fox sampled using a GPS at a rate of 1 Hz. Trace 802 of FIG. 8B shows the position of the flying fox reconstructed using samples obtained by duty-cycling the GPS receiver to obtain a position estimate every 10 minutes. Trace 803 of FIG. 8C shows the position of the flying fox reconstructed by sampling the GPS at points with the highest significance allowing accurate trajectory reconstruction while also operating at a low duty cycle.

Current Limitations

Current commercial wildlife trackers use a combination of motion-triggering and time-based duty cycling of GPS for energy management. In particular, motion sensors are used to detect the start and end of motion events according to a given movement threshold and GPS samples are only taken during the motion events. Time-based approaches set a fixed duty cycle for GPS. A simple combination of the two approaches uses motion sensors to detect motion and duty cycles GPS within that period to reduce energy consumption. This approach is referred to as duty-cycled tracking in this example. This method effectively spreads the GPS samples in time evenly for the duration of the motion event. Its drawback is that it may miss significant parts of a trajectory that occur between scheduled samples. Therefore, sampling at the right point in time is desirable in order to reconstruct the original trajectory as accurately as possible.

To illustrate the potential drawbacks of duty-cycled tracking at fixed time intervals, GPS samples were collected at high temporal resolution for a 6-hour flying fox trajectory, which serves as ground truth data in this example, as shown in FIG. 8A. Operating the GPS at a duty cycle of 1 sample every 10 minutes is simulated to evaluate the accuracy of a subsequently reconstructed trajectory, as shown in FIG. 8B. While the duty-cycled approach is able to capture coarse movements, it wastes energy during periods where to tracked animal is not moving. In order to evaluate the extent of the drawbacks of the duty-cycled tracking at fixed time intervals, an offline algorithm, referred to as the oracle in this example, is employed that selects the points of the original trajectory which provide the best reconstruction using interpolation (see FIG. 8A), while expending the equivalent amount of energy. Thus, the duty cycled sampling misses significant features of the original trajectories, while the oracle tracks the original trajectory with much lower error.

The analysis in this example has shown that for the presented trajectories, there is a large gap between the tracking error of the duty cycled approach compared to the optimal case. In the remainder of this example, the design of real-time adaptive algorithms that approach this optimal case based on inertial sensor inputs, time, and energy budget is discussed.

Problem Statement

Using solar panels provides a periodic replenishment of energy at the tracking devices, effectively setting a daily energy budget. Much of the current work on energy-efficient tracking has focused on minimizing energy consumption while tracking with a given error bound. This example focuses on minimizing tracking error subject to a given energy budget. In order to guarantee long-term operation with the highest possible tracking accuracy, this example aims to: (1) schedule GPS samples to minimize the tracking error relative to the actual trajectory; and (2) match the daily energy expenditure to the harvested energy budget for energy neutral operation.

System Architecture

Data is collected from mobile nodes, through communication nodes which in this example are referred to as base stations that are installed at congregation areas, such as roosting camps for flying foxes. The mobile nodes in this example have a low-power short-range radio to talk to the base stations and the base stations use a 3G connection to upload data to our server. This setup allows us to save on the weight and energy cost of a solution that would include 3G chip on each mobile node.

Mobile Tracking Platform

The custom designed sensor platform (see, for an example platform, R. Jurdak, P. Sommer, B. Kusy, N. Kottege, C. Crossman, A. Mckeown, and D. Westcott. Camazotz: Multimodal Activity-based GPS Sampling. In *Proceedings of the 12th international conference on Information processing in sensor networks (IPSN)*, pages 67-78, 2013) is employed on the mobile nodes for GPS location tracking, which is optimized for small size and low weight. While the platform was designed for the specific constraints of the fruit-bat tracking application, it serves well for evaluating performance of energy-aware location tracking algorithms.

Figure 9A:
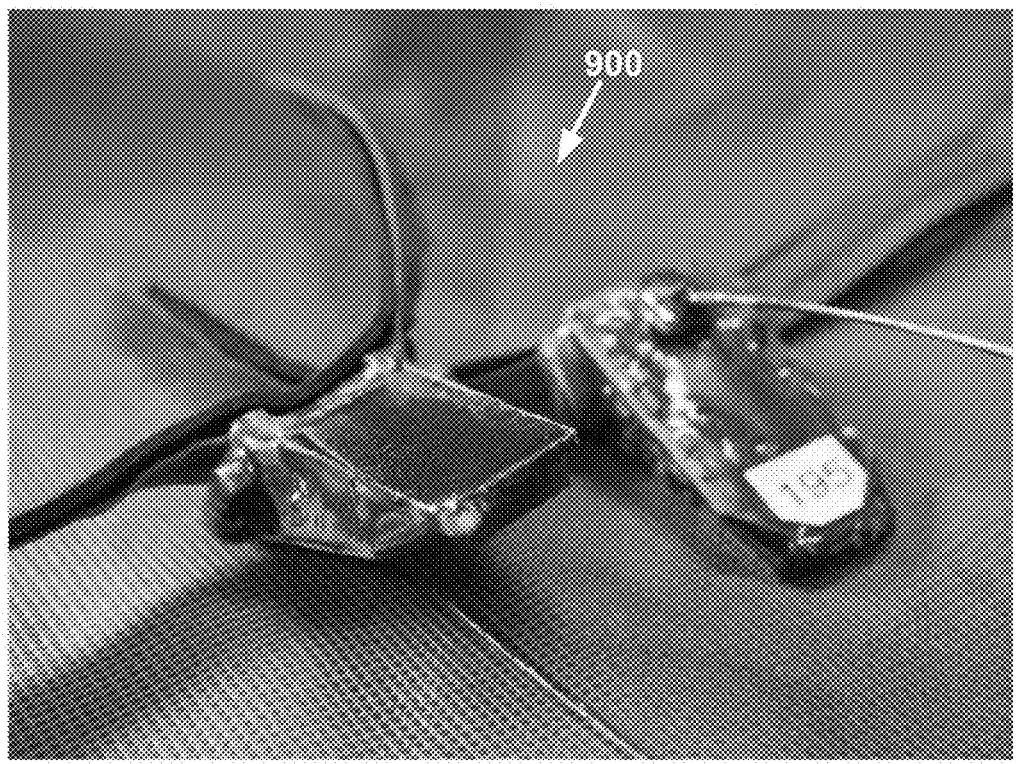
FIG. 9A is an image of an example of a portable position tracking apparatus.
Figure 9B:
FIG. 9B is an image of the apparatus of FIG. 9A, in use.

An example of a mobile node collar 900 is provided in FIG. 9A, and the collar 900 in use on a spectacled flying fox (Pteropus conspicillatus) is shown in FIG. 9B.

The platform is designed around a Texas Instruments CC430 system-on-chip, which combines a MSP430 core with a low power CC1101 radio chip operating in the 915 MHz band. The mobile node platform integrates a GPS receiver and several sensors, such as accelerometer, magnetometer, temperature/pressure and a microphone. The additional sensors detect motion and activity level of the tracked object, such as roosting or flying of flying foxes, which can then be used as a basis for scheduling GPS sampling in an energy efficient manner. The inertial sensors can also be used to estimate location through dead reckoning, a low-power alternative to the GPS sampling.

The mobile node platform is designed to aggressively duty cycle its sensing, computation, and communication as the platform typically works continuously using the energy harvested through a small solar panel. Low-power inertial sensors detect an activity level of the tracked object, such as rest periods when animals are sleeping, or motion events when they forage for food. All on-board sensors are put into a deep sleep state when the tracked animal is mostly passive. Location and activity characteristics are logged to an on-board flash memory only when activity is detected.

Power consumption of individual hardware components is an important parameter required for energy-optimal GPS sampling. Table 1 provides an overview of the power consumption of main components.

TABLE 1

Power consumption of the main components on the mobile node platform.

| Component | Sleep | Normal |
| --- | --- | --- |
| Acceleration/Compass (LSM303) | 1 µA | 110 µA |
| Pressure/temperature (BMP085) | 0.1 µA | 5 µA |
| GPS (MAX-6) | 22 µA | 41-47 mA |
| Flash (AT25) | 15 µA | 12 mA |
| Radio (RF1A) | 100 µA | 16 mA |
| Microcontroller (CC430F5137) | 2.2 µA | 3.65 mA |

Energy Harvesting

The mobile node platform harvests energy using a 34×22 mm$^2$ solar panel mounted on the outside of the node enclosure. The panels are rated at 40 mA in direct sunlight and a 300 mAh single cell lithium-ion battery is used to store the harvested energy. The charging circuitry incorporates a solar charging bypass circuit that allows us to power up the node directly from the solar panels. This circuit efficiently powers up a node when the battery is completely flat. The hardware switch that controls when the bypass circuit is enabled is connected to a General Purpose Input/Output (GPIO) of the microcontroller, so that the microcontroller can detect when the system is powered by the solar panels in software.

Satellite-Based Positioning (GPS)

The u-blox MAX-6 GPS module with a chip antenna and a low-noise amplifier is used to sample position, altitude, and speed of animals. Furthermore, the GPS time is used to obtain accurate time of day for the real-time clock of the mobile node. The time interval until a first position fix is obtained after enabling the GPS, also called the time to first fix (TTFF), highly depends on the internal state of the receiver logic. If the GPS receiver starts without previous information describing satellite trajectories (almanach and ephemeris) and the current time, it may acquire this information first by listening to the data transmitted by the GPS satellites (coldstart), which can take up to a minute or longer. Subsequent starts of the GPS can rely on satellite information locally stored in the receiver's memory and provide a first fix much faster (hotstart). The MAX-6 module supports a backup mode (22 µA) where the core circuits of the GPS receiver are disabled and power is only provided to specific memory locations and the internal clock. This allows us to save energy between GPS fixes while still being able to initiate a GPS hotstart upon wake-up.

Figure 10:
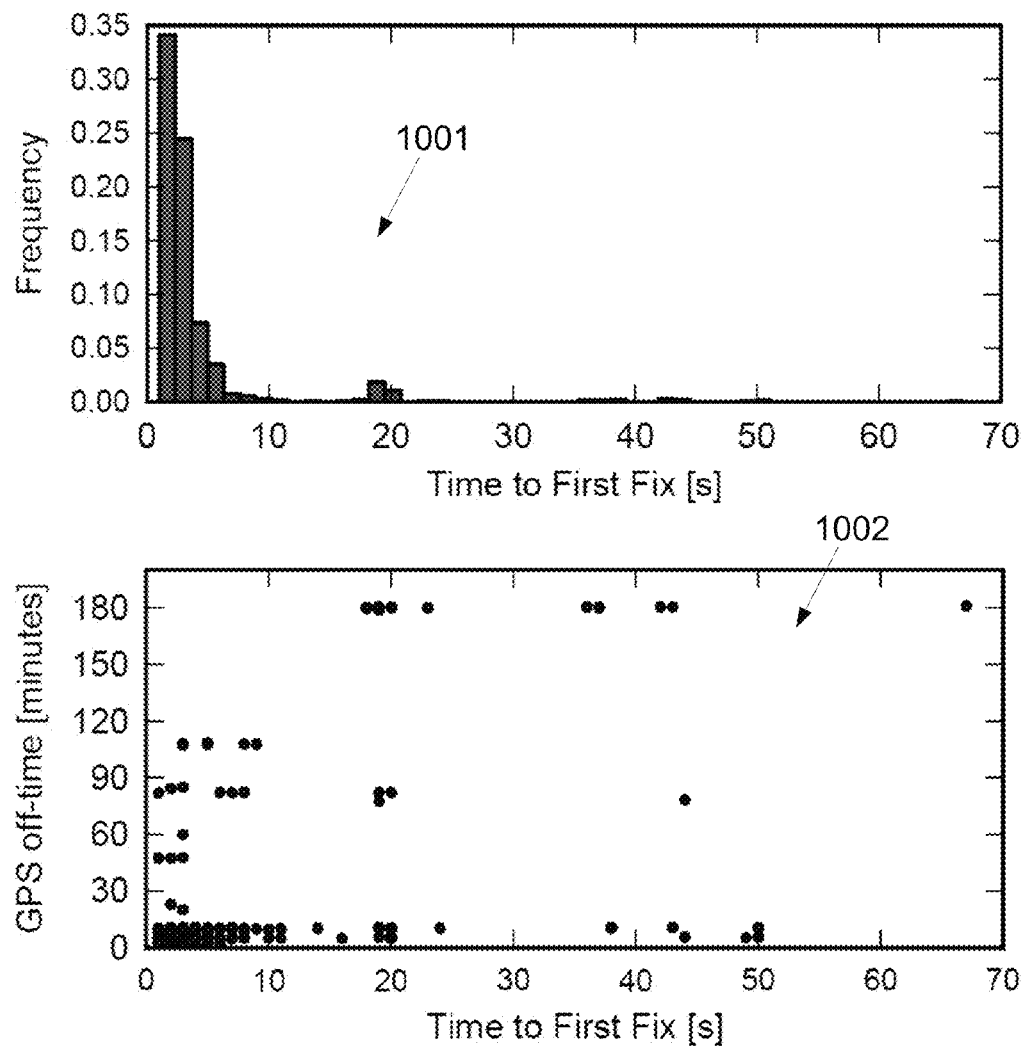
FIG. 10 is two graphs of examples of a distribution of time to first GPS fix and a relation between the preceding GPS off interval and the time to first fix, respectively.

Experiments were conducted to model energy consumption of GPS in simulations, and this is discussed further below. TTFF values of 1103 successful GPS location requests on two mobile nodes were collected. In this example, reported values for TTFF are between 1 and 67 seconds while on average it took 4.17 seconds to get the first valid position, as shown in FIG. 10. In this regard, the trace 1001 shows a distribution of the time to first GPS fix, and samples 1002 show the relationship between the preceding GPS off interval and the time to first fix.

In this example, it took longer to obtain the first fix when the GPS was inactive for a longer period of time, as the real-time clock is recalibrated and satellite information might be outdated. The parameters used for the simulations in this example are summarised in Table 2.

TABLE 2

Typical power consumption in different modes and parameters of a GPS model used in this example

| Parameter | Value |
| --- | --- |
| GPS sleep mode | 22 µA |
| GPS tracking mode | 39 mA |
| GPS hot-start | 4.17 sec |
| GPS cold-start | 26 sec |

Inertial Sensors

In order to facilitate activity detection based on low-power sensor input, the hardware platform in this example is equipped with the LSM303DLHC inertial module from STMicroelectronics, which combines a 3-axis accelerometer and a 3-axis magnetometer in a single chip. Both the accelerometer and magnetometer can be operated independently or at the same time. The accelerometer provides samples of the acceleration along its three axes at a sampling frequency between 1 Hz and several kHz. The magnetometer measures the strength of the magnetic field at a data rate between 0.75 Hz and 220 Hz along three axes. In addition to continuous sampling of acceleration and magnetic field, the LSM303 sensor further provides two programmable interrupts for detection of freefall and motion events. This functionality can unburden the microcontroller from having to continuously read samples from the accelerometer's output buffer. Instead, the accelerometer can trigger an interrupt line when the measured acceleration exceeds a certain threshold, which allows the microcontroller to remain in sleep mode.

Energy Management

The goal of this work is to achieve the best possible tracking accuracy while maintaining the energy consumption within the specified energy budget for a given time interval. This is different from many other power efficient location tracking algorithms that focus on minimizing energy consumption given specific location accuracy constraints. Accuracy constraints provide short guarantees on tracking performance, yet the static nature of the constraints disregards the variability of motion patterns, which characterise most moving entities, and energy availability over time, which is common for applications with energy harvesting.

Energy management for tracking with energy harvesting is used in this example, and typically the available energy budget for tracking varies depending on the recently harvested energy. In order to optimise tracking performance, an energy aware tracking framework is used in this example, which considers currently available energy, forecasts of energy use and input, and forecasts of movement. While the framework of this example does not provide explicit accuracy constraints, its energy-aware sampling decisions maximise location accuracy over the forecast period, which as results show ultimately delivers higher accuracy tracking than previous approaches that explicitly specify fixed accuracy constraints. The framework is discussed below in the context of the motivating application of tracking flying foxes.

For tracking of nocturnal animals, nodes typically balance the energy they harvest from solar panels during the day (energy intake) and the energy spent for tracking the location of animals during the night (energy consumption). It is therefore desirable to use less or equal to the amount of energy stored within the scheduling interval. On the other hand, if the energy budget is exceeded, the battery might be nearly drained and the voltage supervisor circuit turns off the system until the battery has been recharged up to a certain threshold. Although the circuitry of the nodes is designed to recover from energy black-outs, reinitializing of system components, such as the obtaining a real-time clock by performing a GPS coldstart, is an expensive process which is preferably avoided.

Figure 11:
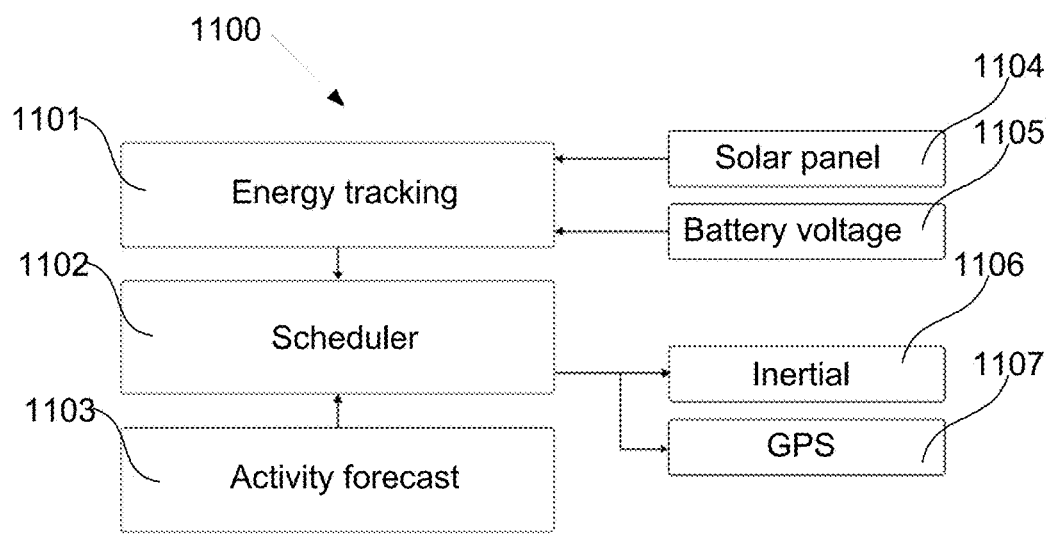
FIG. 11 is a schematic diagram of a further example of a portable position tracking apparatus.

The following describes an example of a scheduling framework for autonomous sensing applications, which accounts for currently available energy and a target budget over a specified time interval. The building blocks of the proposed framework are depicted in FIG. 11. In this regard, the framework includes a scheduler component 1102, which uses inputs from the Energy Tracking 1101 and Activity Forecast 1103 software modules to schedule different sensing hardware components such as the GPS receiver 1107 or inertial sensors 1106.

Tracking Energy Resources

Tracking of both energy consumption and energy harvesting is desirable in order to obtain a realistic estimate of the remaining energy available. The Energy Tracking 1101 component keeps track of the available energy stored in the batteries, the so called state of charge (SOC). A large body of literature exists on different methods for estimating the SOC of battery of embedded devices. Approaches range from dedicated hardware chips for energy estimation.

Energy Harvesting.

Measuring the instantaneous battery voltage alone typically only provides a rough estimate of the state of charge as the voltage remains relatively constant over a large fraction of the SOC range. Thus, to minimize the error in the SOC estimates, the hardware platform measures the solar charge current, the solar voltage, and the battery voltage level.

Energy Consumption.

The mobile nodes also keeps track of energy outputs during runtime using software book-keeping. The instantaneous overall consumption of a sensor node can be broken down into the power consumption of its individual hardware components $c_i$, which includes the different sensors, microcontroller, and flash storage chips. The overall power consumption of the sensor node may be calculated as:

$$P = \Sigma P_i, \quad (1)$$

where $P_i$ is the is the power consumption of component i.

The power consumption of each component i is dependent on its current operating state $s_i$. A state indicator function $s_i$ (t, m) to denote which state the component is in is defined as:

$$s_i(t, m) = \begin{cases} 1 & \text{if component } c_i \text{ is in state } m \text{ at time } t \\ 0 & \text{otherwise} \end{cases} \quad (2)$$

The instantaneous power consumption of each component i at time t is the sum of its power consumption in each state, weighted by the time the component spent in that state. The overall energy used by the sensor node during a time interval [0, T] is simply the sum of the instantaneous power consumption of the node P[t] over all instances in the interval [0, T].

State of Charge Estimation.

Based on the measured energy inputs and outputs, a self-calibrating method is used in this example for estimating the net energy change on the node that runs at regular time intervals. In testing, software book-keeping on the mobile node estimates the energy outputs to within 10%. Combined with the accurate estimation of solar inputs, this results in an accurate estimate of SOC of the mobile node device in software.

Activity Forecast

Optimal selection amongst the location tracking strategies depends both on the accurate estimate of the available energy budget and a predicted amount of energy which will be used for tracking movements. Therefore, it is desirable that the scheduler 1102 knows how long tracking mode will last within a certain time interval, for example, during nightly foraging from sunset to sunrise. In this example, it is assumed that a set of daily representative trajectories that an object of interest traverses is provided, so that an expected cumulative duration of motion events $\Delta t_{predicted}$ for a tracked object may be determined. The Activity Forecast 1103 module will also track the aggregate time $\Delta t_{detected}$ that an object has spent in motion during the current time interval, which allows for periodic updates of the estimate of the duration of the remaining motion events. Thus, the accuracy of the time prediction is influenced by the performance of the scheduling algorithm. If the actual total tracking time exceeds the prediction, there is a risk of expending the energy early or having to sacrifice accuracy of tracking. On the other hand, overestimating the total tracking time may lead to conservative budgeting of energy resources and thus larger localization errors. The impact of the travel time prediction on the energy consumption and localization accuracy will be discussed in detail below.

Activity Prediction for Flying Foxes.

Readings from the accelerometer on the mobile node platform were collected to detect temporal variations in movement activity of a single collared animal. The dataset contains acceleration readings at 10 Hz collected during 2 seconds bursts every 15 minutes with a total of 13,440 samples collected over a time period of 7 days. An acceleration vector is obtained from combining the readings along the three axes of the coordinate system. If the animal is remains in a resting position, the mean value of the observations within a burst is equal to the gravity and the variance of the observations is small. Two different movement patterns are distinguished in this example: (1) when the animal is flying and (2) posture changes while roosting, feeding or interacting with other animals. During flying, a larger variance in the readings when the animal is flapping its wings and the maximum acceleration within a burst is significantly higher than during periods of resting. This difference may be used to build a classifier to categorize each burst into flying or non-flying states, based on the maximum value and variance of its observations.

Figure 12:
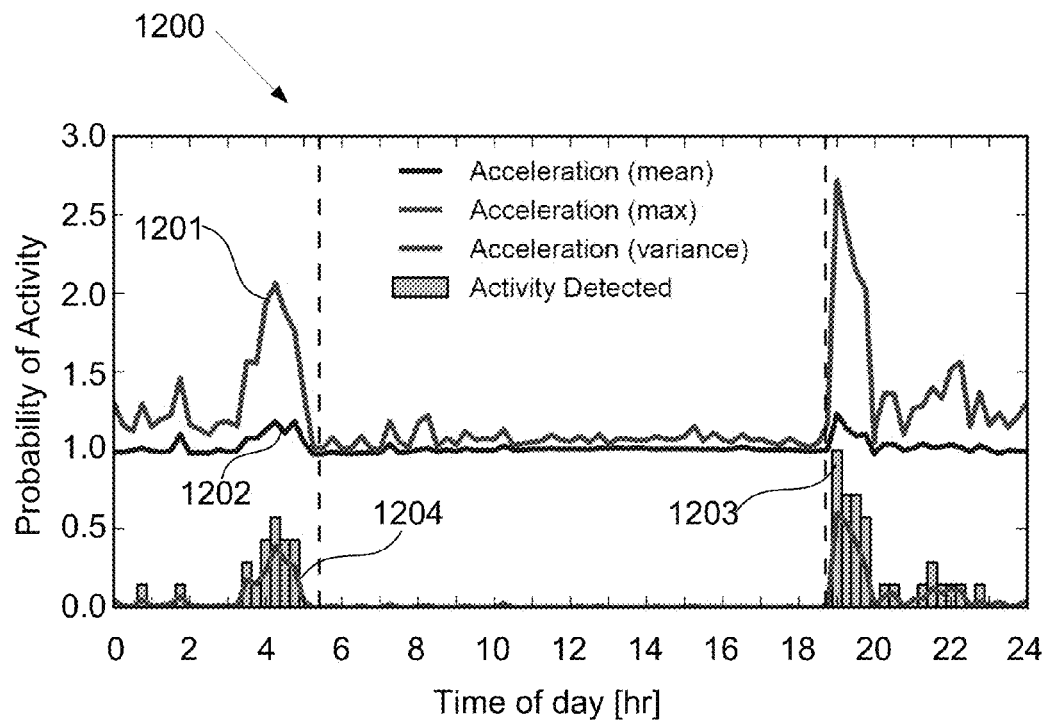
FIG. 12 is a graph of an example of acceleration sensor measurements taken in respect of an individual flying fox.

FIG. 12 shows acceleration readings and the probability of activity (flying) aggregated by the time of day. In this regard, the activity of an individual flying fox was derived from acceleration sensor readings collected at 10 Hz during 2 seconds every 15 minutes for 1 week. The trace 1201 represents the maximum acceleration, trace 1202 represents mean acceleration, trace 1203 represents detected activity and trace 1204 represents a variance in the acceleration readings.

Figure 13:
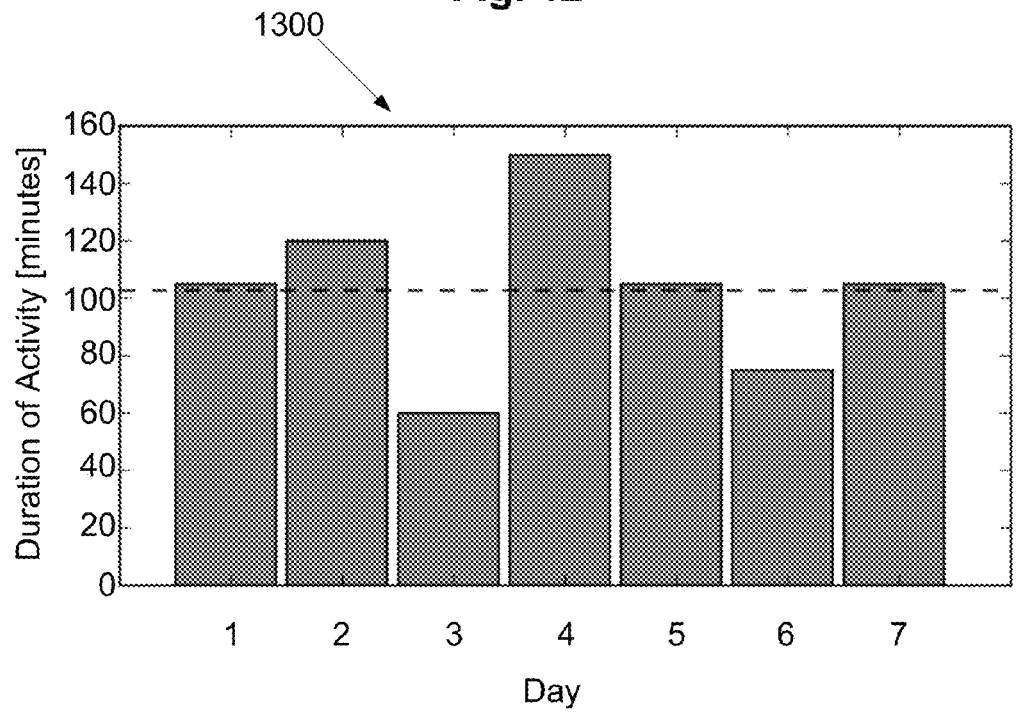
FIG. 13 is a graph of an example of an estimated daily activity (flying) duration for an individual flying fox based on acceleration sensor measurements.

Thus, flying activities in this example typically occur with high probability immediately after sunset and in the hours before sunrise. During the remaining time of the night, other activities of shorter duration were detected. This results is supported by empirical data acquired at high spatio-temporal resolution which also indicates that long flights occur after sunset and before sunrise, while the animals fly for shorter periods during nightly foraging. Based on the classification of each 15 minute interval into flying or non-flying states, the total flying time for each day of the observation period is estimated, as depicted in FIG. 13. In this regard, trace 1300 shows the estimated daily activity (flying) duration for an individual flying fox based on acceleration sensor readings at an interval of 15 minutes, where the dashed line indicates the average daily duration. In this example dataset an average flying duration is about 103 minutes with a standard deviation of 27 minutes.

Energy-Aware Scheduler

The energy-aware scheduler 1102 is used to select a tracking strategy that meets the constraints of the current energy budget of the node and minimizes the expected tracking error using the chosen strategy. A description of an example scheduling algorithm is provided in pseudo-code below:

---
Scheduling algorithm

```
schedule(t...interval) {
    # update energy budget (SoC)
    E...budget = calculateAvailableEnergy(t...interval)
    # update remaining tracking duration
    t...movement = forecastTrackingDuration( )
    # select best strategy
    strategy = selectStrategy(E...budget, t...interval, t...movement)
    # execute strategy with given power constraints
    strategy.execute( )
}
```
---

The scheduling algorithm is executed periodically by a software routine on the tracking device. In the first step, the available energy budget is estimated $E_{budget}[t]$, which is based on accurate estimation of the state of energy storage cells (e.g., batteries) by the Energy Tracking 1101 module. A predicted value for time interval $\Delta t_{movement}$, during which the tracked object is likely to be changing its location within a specified time period $\Delta t_{interval}$. Next, the scheduler 1102 selects the tracking strategy whose expected power consumption is within the available power budget and provides the least estimated location tracking error.

It is desirable to ensure that the optimal tracking strategy is selected given the energy constraints $E_{budget}$ for the time interval $\Delta t_{interval}$ and the predicted duration of movement $\Delta t_{movement}$.

During the selection process, the target duty-cycle is determined for each tracking strategy based on the power consumption of the system components required to execute the tracking algorithm. The total energy consumption is the sum of energy spent for different operating states and can be calculated as follows:

$$E_{forecast} = \Delta t_{interval} \cdot P_{baseline} + \delta \cdot \Delta t_{movement} \cdot P_{tracking}. \quad (5)$$

In this equation $P_{baseline}$ denotes the baseline power consumption when the system is not tracking, $P_{tracking}$ is the additional power used during tracking, and $\delta$ is the tracking duty-cycle during movements. Consequently, the upper limit for the duty-cycle $\delta$ can be calculated by setting $E_{forecast} = E_{budget}$. The resulting upper bound for the duty-cycle $\delta$ can then be calculated as follows:

$$\delta = \max\left(\frac{E_{budget} - \Delta t_{interval} \cdot P_{baseline}}{\Delta t_{movement} \cdot P_{tracking}}, 1\right). \quad (6)$$

Both the power consumption during baseline (not tracking) and tracking is specific to the chosen strategy. Different tracking algorithms typically require input from different sensor components, which each have a specific power consumption. Different tracking algorithms and their power considerations will be discussed further below.

A given energy budget typically only allow us to operate the GPS sensor at a corresponding duty-cycle. Therefore, only a limited set position samples corresponding to way-points of the trajectory may be measured. Localization between these waypoints is based on linear interpolation of time and position introducing errors based on the specific original trajectory. It is assumed that an estimate of the expected localization error based on historical trajectories is representative of the tracked object's mobility patterns.

Tracking Strategies

A tracking strategy in this example includes an algorithm that schedules sampling of different sensor devices based on a target energy budget and predicted movement duration. The output of an execution of the algorithm is a set of timestamped GPS coordinates describing the movement path. In this example, the GPS receiver provides accurate position fixes. However, operating the GPS receiver requires a significant amount of energy, which may be orders of magnitude larger than the power consumption of other sensors.

Time-Based Scheduling

Duty-cycling the GPS receiver periodically based on the realtime clock is a simple strategy for energy saving, which does not require any additional sensor input other than a time source. Furthermore, the amount of energy spent can be estimated beforehand based on the selected GPS duty-cycle. While time-based scheduling provides periodic snapshots of the positions at pre-defined time points, it often fails to capture the details of short-term manoeuvres such as loops or turns.

Due to the complexity of GPS signal processing, special care is typically taken when operating a GPS receiver intermittently. An accurate position may be only available after a delay, which depends on the receiver state (coldstart, warmstart, hotstart) and external conditions such as GPS signal quality.

$$E_{gps} = (1-\delta) \cdot \Delta t_{interval} \cdot P_{backup} + \delta \Delta t_{interval} \cdot P_{active} \quad (5)$$

Inertial-Based Scheduling

In addition to time-based strategy, this example uses inertial sensors including motion sensor and compass to perform activity classification. The rationale is to maximize the chance of capturing short bursts of movements with high accuracy by detecting them as soon as they occur. The following types of activities are potentially significant for position tracking:

Change of Mobility State.

When the moving object enters stationary state from moving state, a single sample is sufficient to describe the position of object until it moves again. Duplicate GPS samples are not typically required at the same location.

Change of Heading.

Detecting significant turning points of a trajectory is desirable in accurate and energy-efficient tracking. By detecting significant turns of the moving object, samples are obtained at points which may otherwise introduce large errors into the sampled trajectory. However, in some examples heavy reliance on the capture of turning points may result in excessive sampling in cases where many turns are made during a short period of time.

Adaptive Activity Detection

Figure 15:
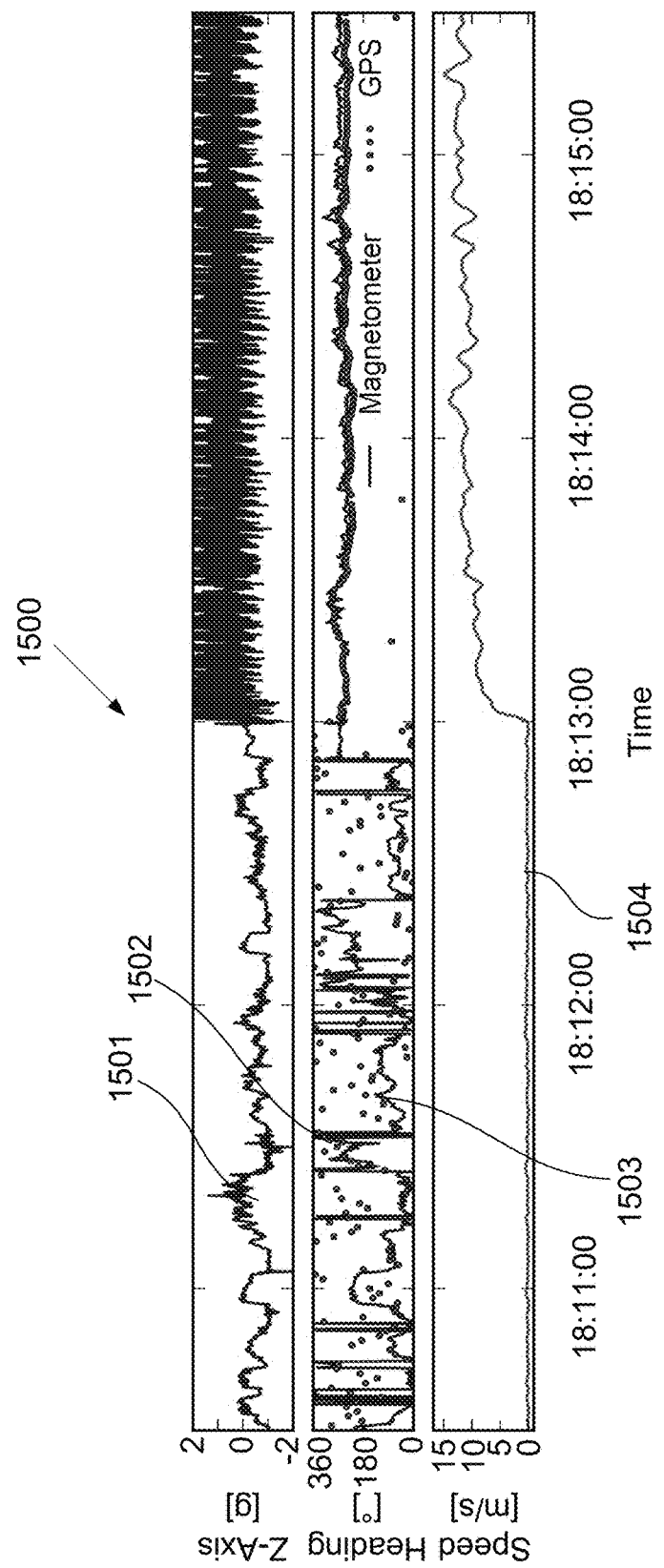
FIG. 15 is a graph of an example of measurements of motion using an accelerometer, 3-axis magnetometer and GPS speed of a flying fox shortly after sunset.

In order to demonstrate the feasibility of activity classification based on acceleration data, continuous samples are determined using the accelerometer at a rate of 10 Hz shortly before and after the animal is leaving the roosting camp and flies toward the foraging area, as shown in FIG. 15. The acceleration along the $z_{axis}$, shown in trace 1501, which is a perpendicular direction exhibits larger variations and its maximum value exceeds +2 g while the animal is flying, likely being caused by wing beats. The heading provided by the GPS 1502 and the magnetometer 1503 are also shown in graph 1500, as well as the measurements of GPS speed 1504.

To utilize acceleration data to detect the animal's activity, in this example the accumulated change in the acceleration along the z-axis within a time frame is tracked as a classifier for the animal's motion status. For each 5-second time window, the classifier calculates an accumulated acceleration change, and averages the accumulated change over the seconds. Using a threshold on the average accumulated change, the classifier is able to determine the motion status of the animal. If the average accumulated acceleration change is greater than the threshold, the animal is classified as flying in that time window. The threshold is adaptively learned during the training phase: when a false positive occurs, the threshold is increased; when a false negative occurs, it is decreased. Then the threshold learned is used until next training.

To evaluate the classifier, 5-fold cross-validation for 20 repetitions is performed on a dataset that consists of 2283 GPS samples and 30972 acceleration samples in a 137-minute time span. 1081 GPS samples are taken as the animal is flying, and 1202 samples are taken as it being stationary. For each repetition, the dataset is randomly split into 5 independent folds, and one fold is used to train the threshold, which is later used in the testing phase on the rest of the data. The actual GPS speed is used as ground truth. If the GPS speed of the animal is greater than 1 meter per second, the animal is considered flying as the ground truth. On this dataset, the classifier reaches 0.986 average precision and 0.999 average recall in 20 repetitions.

Figure 14:
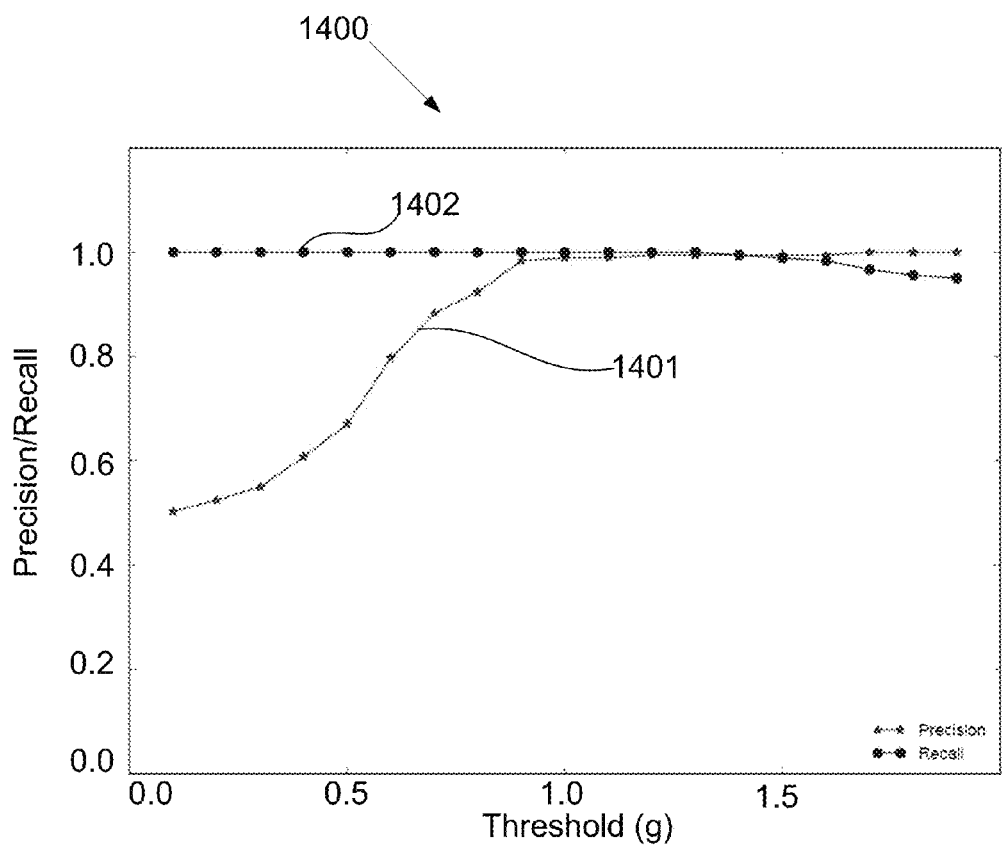
FIG. 14 is a graph of an example of an accumulated change in acceleration of a flying fox along a z-axis.

FIG. 14 shows the accumulated change in the acceleration along z-axis for the abovementioned datasets, and in this regard trace 1401 relates to precision and trace 1402 relates to recall.

Advanced-Inertial Scheduling.

An intelligent scheduling strategy based on inertial sensors is used in this example, where the strategy is also able to harness the power of other strategies. The strategy uses the advantages of moving state detection, turning point detection and duty-cycling. To prevent over sampling caused by frequent changes in the heading angles in a short time period, a constraint on the time difference between two GPS samples is imposed, no matter which strategy the last GPS sample was taken by. Thus, in this example the basic rules of the strategy are as follows:

1. When the moving object transits states between moving and stationary, a GPS sample is obtained. For all other times where the object remains stationary, no sample is taken.
2. When the object is in moving state, the compass is used to track the cumulative heading change since the last GPS sample point. In this regard, the angle change may be either positive or negative, so that the slight and swinging changes in an overall straight trajectory may typically be cancelled out. When the accumulated heading angle reaches a predefined threshold, the strategy will consider obtaining a GPS sample. Formally, at time $t_k$, given the maximal heading angle $\theta_k^{max}$ and minimal heading angle $\theta_k^{min}$ in a previous time windows of N samples, IsTurning($t_k$) is used to determine if the object is performing a turn significant enough for us to track:

$$IsTurning(t_k) = \begin{cases} 1 & \text{if } \theta_k^{max} - \theta_k^{min} \geq \theta' \\ 0 & \text{otherwise} \end{cases} \quad (7)$$

$$\theta_k^{max} = \max\{\theta_k, \theta_{k-1}, \ldots, \theta_{k-N+1}\} \quad (8)$$

$$\theta_k^{min} = \min\{\theta_k, \theta_{k-1}, \ldots, \theta_{k-N+1}\} \quad (9)$$

Here $\Delta\theta'$ is a given threshold.

3. As the previous rule is dependent on a predefined threshold, there may be corner cases where the object is making a significant turn which is not significant enough to fall within the threshold. To handle such cases, a secondary strategy that samples the GPS in a greater time interval is used if no turning point is detected for a relatively long period.
4. A minInterval and a maxInterval are set as the time constraints between two GPS samples. minInterval specifies the time elapsed before the turning point detection strategy may obtain another sample since the last GPS sample. maxInterval specifies the elapsed time before the time-based strategy may obtain another GPS sample since the last GPS sample. The last GPS sample here is shared by both strategies, and maxInterval is typically always greater than minInterval.

Error-Bounded Scheduling (Dead Reckoning)

A scheduling strategy was used based on the estimated orthogonal distance $D_{orth}$ derived from the turning angles and velocity since last GPS sample point.

$$D_{orth}(t_k) = \sum_{i=1}^{k} (t_i - t_{i-1}) S_{start} \sin(\|\theta_{start} - \theta_i\|)(1+\lambda) \quad (10)$$

Here $S_{start}$ is the GPS speed of the last GPS sample, $\theta_i$ is the heading angle of the $i^{th}$ compass sample since the last sample and $t_i$ is the time of the $i^{th}$ compass sample. $\lambda$ models the sensing error introduced by the compass, and is set to 0.05.

$D_{orth}(t_k)$ provides a theoretically upper bound of the position error at a given time point. Whenever $D_{orth}(t_k)$ reaches the given threshold $\varepsilon_d$, a GPS sample is taken. The strategy guarantees that the final error will be less than $\varepsilon_d$ but excessive samples are likely to be taken to satisfy this constraint.

Optimal Offline Scheduling

A set of ordered integers $P=\{1, 2, \ldots, N\}$ is used to denote the indexes of N consecutive GPS samples of a trajectory. Suppose the energy budget only allows at most m samples (excluding the starting and ending points of the trajectory), the optimal subsample of P is a subset $S=\{1, i_1, \ldots, i_k, \ldots, i_{|S|-2}, N | 1 < i_k < N, |S| \leq m+2\}$ which has the minimum distance $D_{min}$ to P. To get the optimal subsample S and $D_{min}$, an auxiliary matrix is constructed $A_{ij} = \max_k\{d_{ij}(k)|i<k<j\}$ where $d_{ij}(k)$ indicates the distance from point k to the interpolated trajectory between i and j. For each $d \in A_{ij}$ a directed graph $G_d=(V,E)$ is constructed where $V=P$ is the set of vertices and $E=\{(i, j)|A_{ij}<d, i, j \in V\}$ is the set of directed edges (the edge is directed from i to j). The shortest path from vertex 1 to vertex N in each $G_d$ is searched for. The shortest path is denoted by a set of ordered indexes $L_d=\{1, i_1, \ldots, i_k, \ldots i_{|L_d|-2}, N\}$. Since $D_{min} \in A_{ij}$, then $D_{min} = \min\{d|d \in A_{ij}, |L_d| \leq m+2\}$ and consequently $S=L_{Dmin}$ can be obtained. (Note that if there are multiple $L_{Dmin}$ typically only one is used.)

Note the naive motion triggering strategy, which starts to sample the GPS upon the occurrence of motion stronger than a threshold, is not discussed here. The reason is that with motion triggering strategy, it typically samples very aggressively as a moving object is constantly in motion.

Evaluation

Figure 19A:
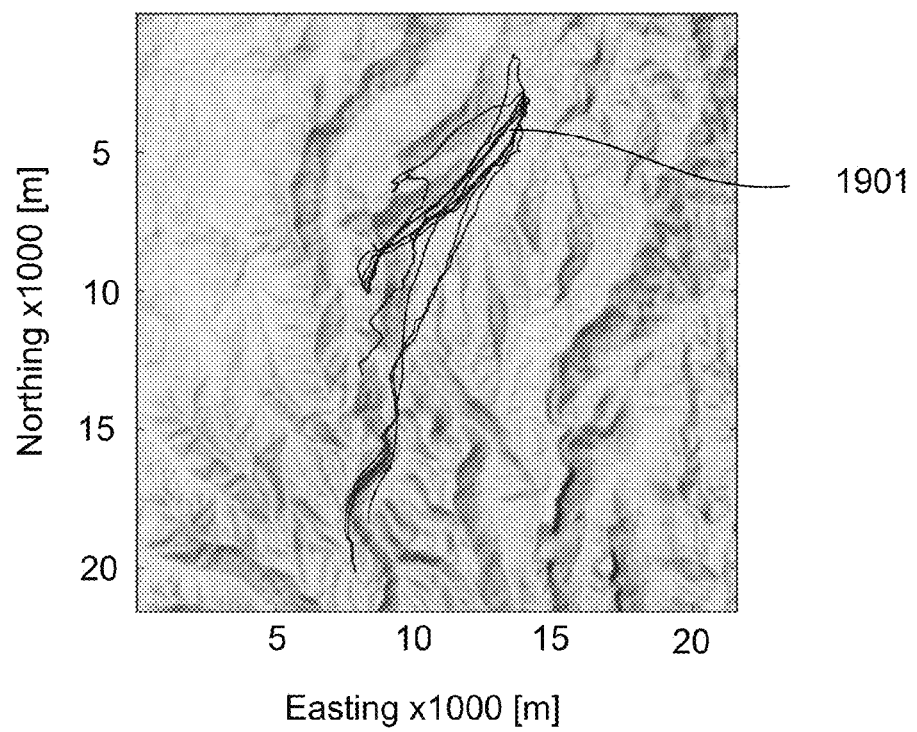
FIG. 19A is an image of an example of a GPS trace of flying foxes.
Figure 19B:
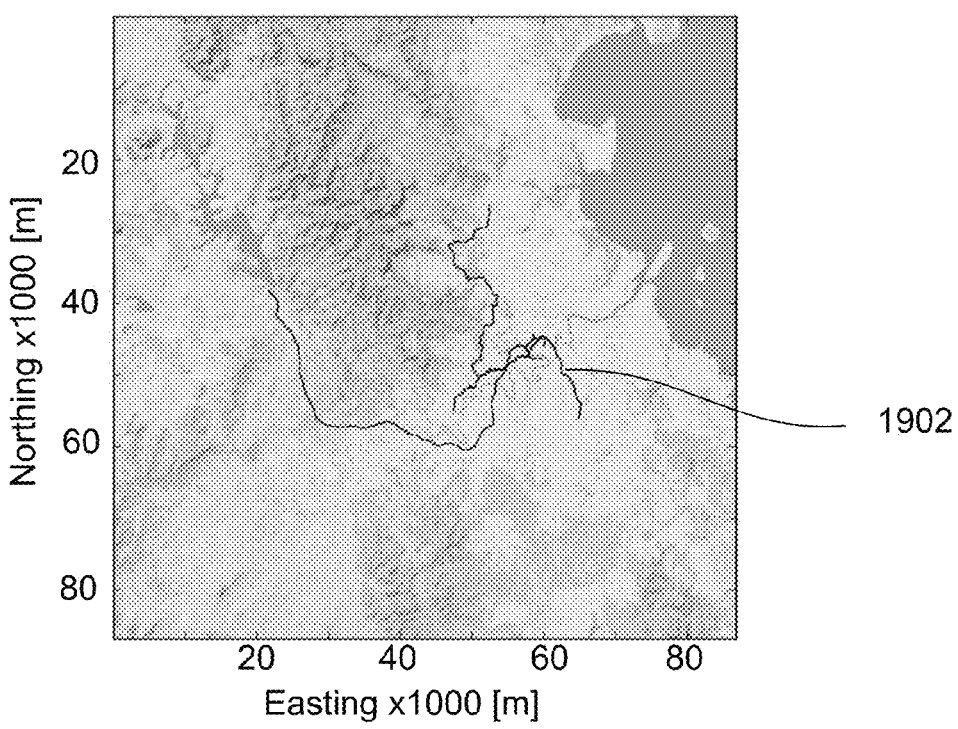
FIG. 19B is an image of an example of a GPS trace of vehicular mobile nodes; and, FIGS. 20A to 20C are graphs of examples of sampling strategies for mobility traces from vehicles.

Experimental results are described here for different tracking in this example using the energy management framework described above. In order to evaluate the performance of the different sampling strategies of this example in real-world scenarios, empirical GPS locations are collected using a mobile node platform for two different application scenarios. The first data set contains GPS traces with high temporal resolution collected from free-living flying foxes. GPS traces from mobile nodes deployed on the dashboard of cars were also collected, forming the second dataset. The vehicular dataset contains several traces within the metropolitan area of a large city and consists of both daily commuting and leisure trips on the weekend. FIGS. 19A and 19B shows the spatial extension of the two datasets, where trace 1901 relates to the first dataset and trace 1902 relates to the second dataset.

Metrics

Two metrics are used in this example to evaluate the tracking strategies, namely the tracking error and the power consumption. Given a tracking strategy, the error metric is used to measure how accurate the obtained trajectories are, and the power consumption is used to indicate how energy efficient the strategy is.

Tracking Error

The tracking error at the discrete time instant $t_k$ is defined as the Euclidean distance between the ground truth location and our estimated location:

$$d[t_k] = \sqrt{(x[t_k] - \hat{x}[t_k])^2 + (y[t_k] - \hat{y}[t_k])^2}, \quad (10)$$

where $x[t_i]$ and $y[t_i]$ are the projected coordinates of the moving object's actual longitude and latitude into the Universal Transverse Mercator (UTM) system, while x̂[$t_k$] and ŷ[$t_k$] are the estimated coordinates, at time $t_i$.

The average tracking error $D_{avg}$ and the worst case tracking error $D_{max}$ is defined in this example as follows:

$$D_{avg} = \frac{1}{T}\sum_{k=0}^{T} d[t_k] \quad (11)$$

$$D_{max} = \max_{0<k\leq T}(d[t_k]). \quad (12)$$

$D_{avg}$ and $D_{max}$ are used to evaluate how accurately an original trajectory is represented with much fewer sample points.

Case Study: Flying Foxes

In this example, the mobile nodes were deployed on seven free living animals, which were collared at the same roosting camp. By default, mobile nodes have been configured to start the GPS receiver every 5 minutes during 6 pm and 6 am to collect five valid position fixes before going back to sleep. A position fix is considered valid if the position accuracy as reported by the GPS is below 100 meters. GPS samples are then stored into the external flash chip on the mobile node and transferred using short-range wireless radio when within proximity of the base station located in the roosting camp.

Mobility Tracking Results

In addition to the periodic GPS samples gathered at regular time intervals, e.g., every 5 minutes during the night, selected nodes were reconfigured to increase the sampling interval, e.g., record continuous GPS samples at 1 Hz if the battery capacity permitted.

Figure 16:
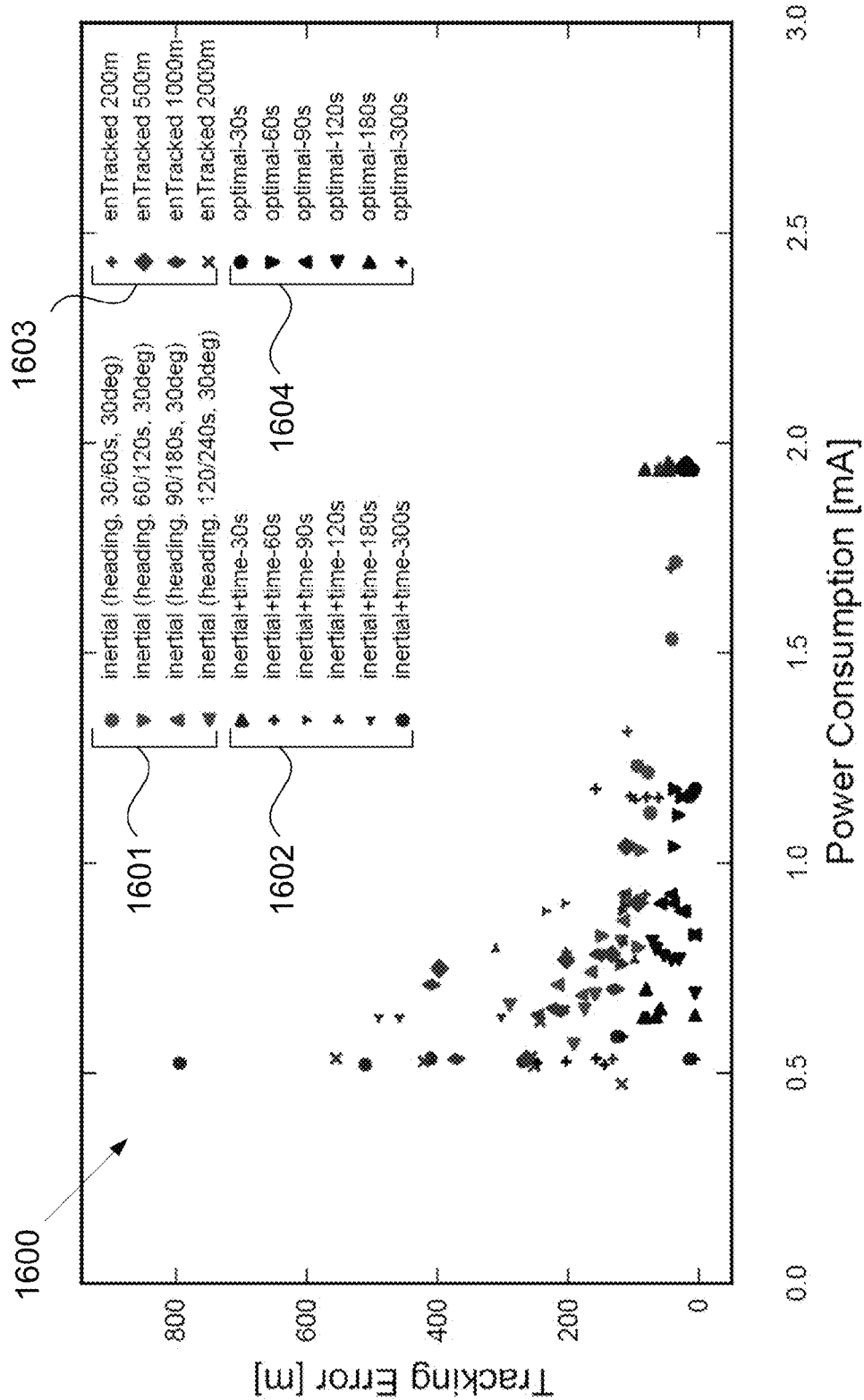
FIG. 16 is a graph of an example of experimental results for power consumption and tracking error of different tracking strategies based upon mobility traces from flying foxes.

Measurement results for different GPS scheduling strategies are shown in FIG. 16, for a number of flying fox trajectories. In this regard, the data points 1601 relate to an inertial strategy, data points 1602 relate to an inertial plus time strategy, data points 1603 relate to an enTracked prior art strategy, and data points 1604 relate to an optimal strategy calculated using the oracle algorithm.

Figure 18A:
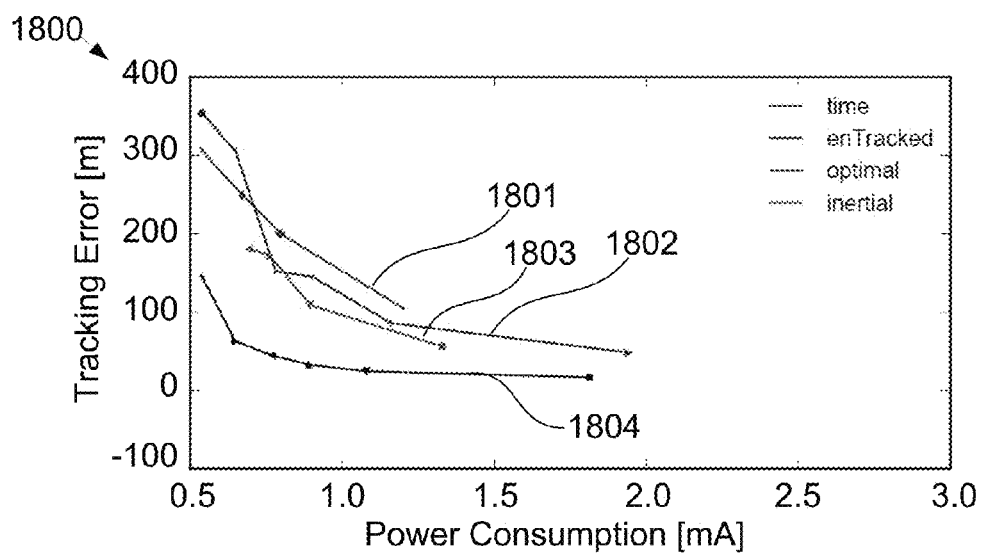
FIGS. 18A to 18C are graphs of examples of sampling strategies for mobility traces from flying foxes.
Figure 18B:
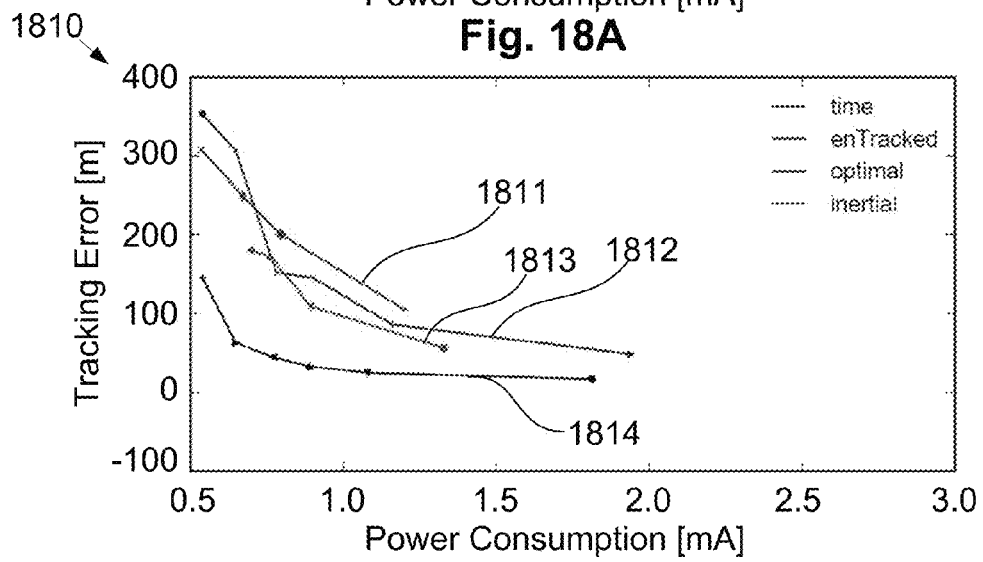
Figure 18C:
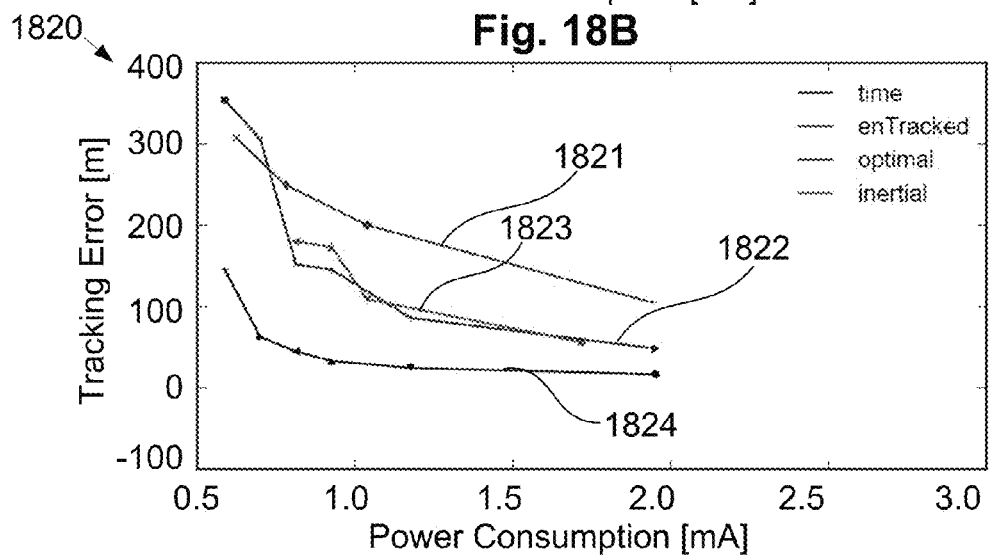

FIGS. 18A to 18C show indicators for historical performance of different scheduling strategies on different flying fox trajectories, where traces 1801, 1811, 1821 relate to the enTracked prior art strategy, traces 1802, 1812, 1822 relate to a time based strategy, traces 1803, 1813, 1823 relate to an inertial based strategy, and traces 1804, 1814, 1824 relate to the optimal strategy. In this regard, graph 1800 of FIG. 18A relates to an 'aggressive' strategy, graph 1810 of FIG. 18B relates to a 'normal' strategy and graph 1820 of FIG. 18C relates to a 'conservative' strategy. In this respect, when selecting a strategy for an available power budget, typically the algorithm considers the historical performance of different strategies which generally meet the available budget. Subsequently, the algorithm will select the strategy which exhibits substantially the smallest error. Thus, FIG. 16 demonstrates how different strategies can have a different performance which could in turn be used to allow a sampling strategy to be selected.

For example, in an aggressive strategy the average energy cost value from all training (or historical) trajectories is used to represent the performance of the strategy. In the normal strategy the average value plus the standard deviation from all energy cost values from all training trajectories is used to represent the performance of the strategy. In addition, in the conservative strategy the maximal energy cost values from all training trajectories is used to represent the performance of the strategy.

Thus, these results show that improvements over prior art strategies can be achieved.

Case Study: Vehicular Mobility Data

Figure 17:
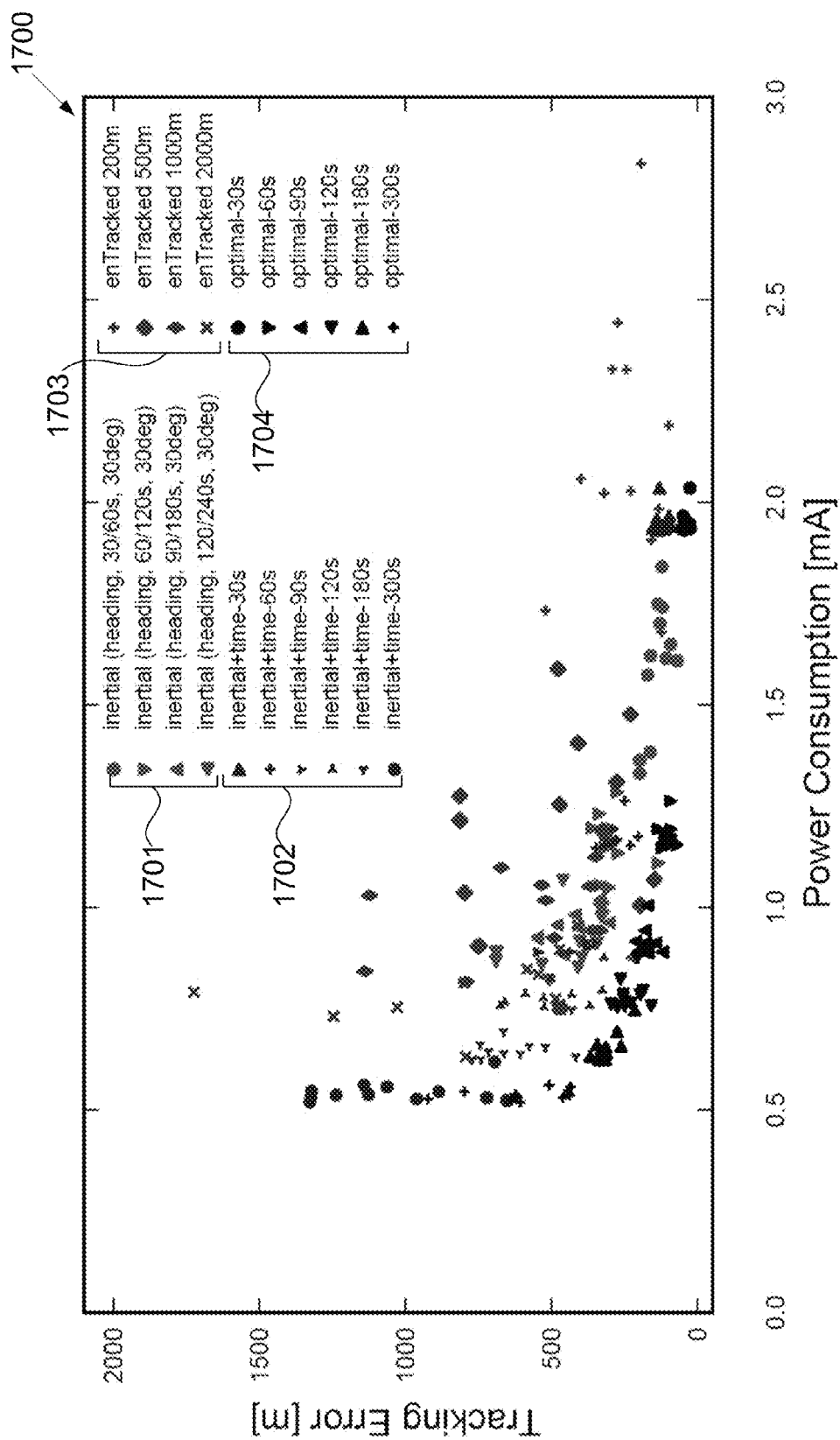
FIG. 17 is a graph of an example of experimental results for power consumption and tracking error of different tracking strategies based upon mobility traces from vehicles.

Results for different GPS scheduling strategies used in respect of the vehicular mobility data are shown in FIG. 17, for a number of vehicle trajectories. In this regard, the data points 1701 relate to an inertial strategy, data points 1702 relate to an inertial plus time strategy, data points 1703 relate to an enTracked prior art strategy, and data points 1704 relate to an optimal strategy calculated using the oracle algorithm. In addition, FIG. 17 also demonstrates how different strategies can have a different performance which could in turn be used to allow a sampling strategy to be selected.

Figure 20A:
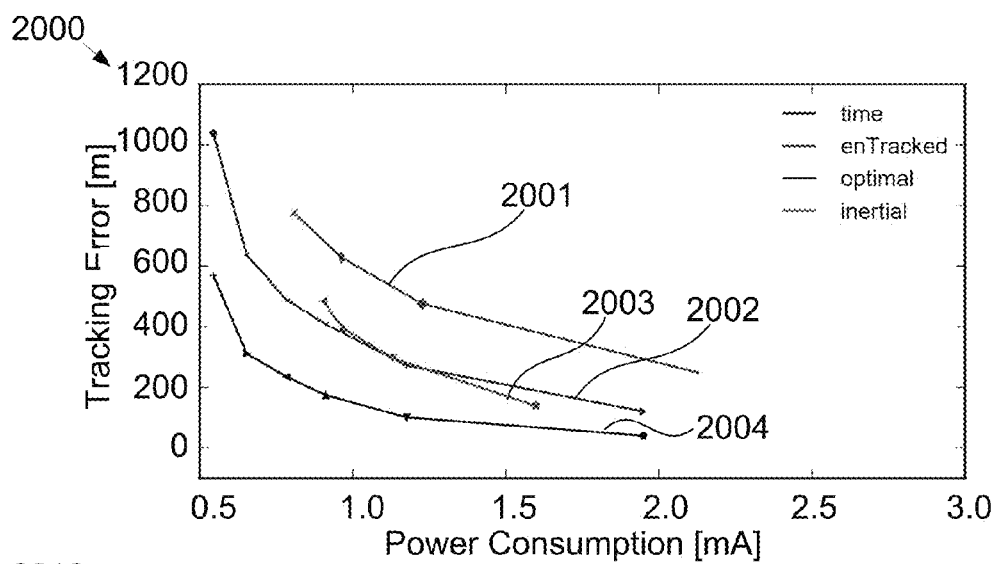
Figure 20B:
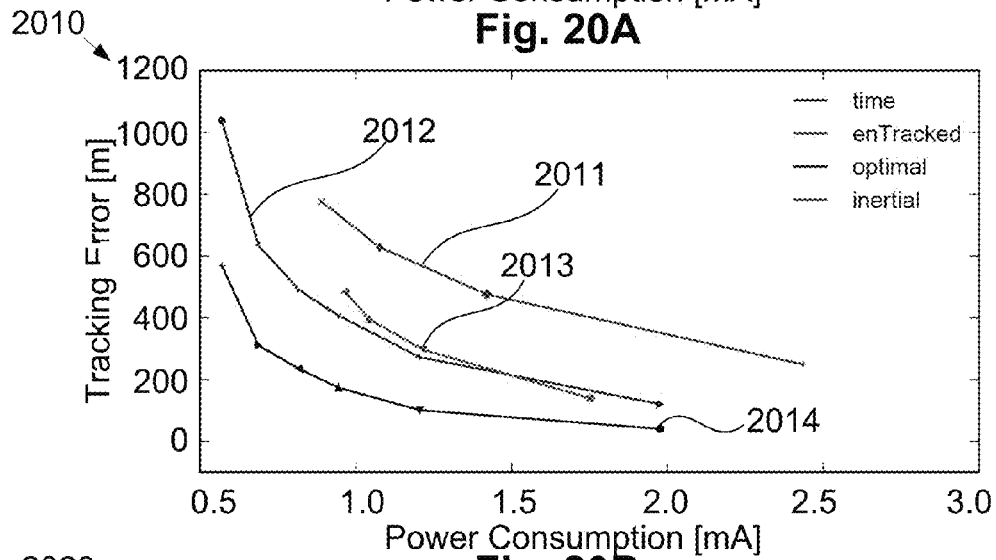
Figure 20C:
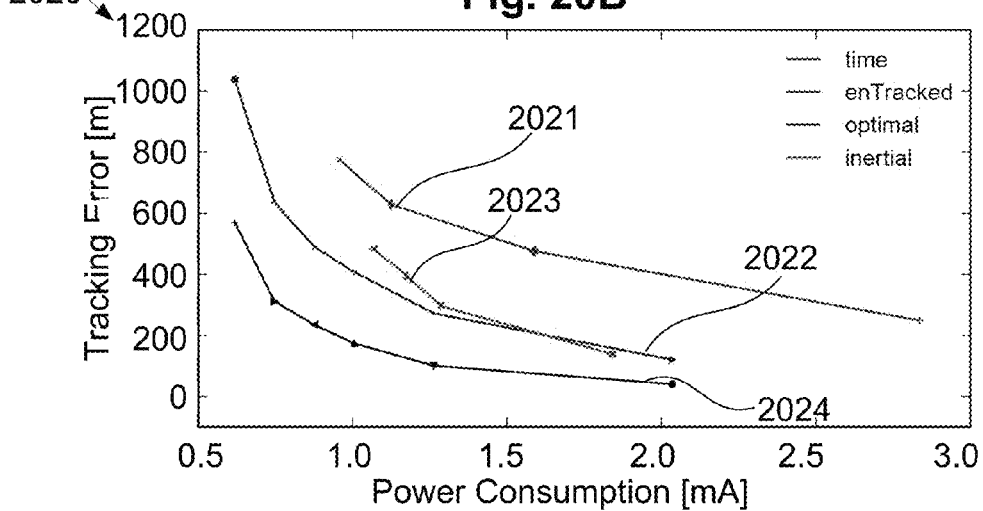

FIGS. 20A to 20C show indicators for historical performance of for different scheduling strategies on vehicle mobility trajectories, where traces 2001, 2011, 2021 relate to the enTracked prior art strategy, traces 2002, 2012, 2022 relate to a time based strategy, traces 2003, 2013, 2023 relate to an inertial based strategy, and traces 2004, 2014, 2024 relate to the optimal strategy. In this regard, graph 2000 of FIG. 20A relates to an 'aggressive' strategy, graph 2010 of FIG. 20B relates to a 'normal' strategy and graph 2020 of FIG. 20C relates to a 'conservative' strategy, and these strategies are discussed in more detail above.

Thus, these results show that improvements over prior art strategies can be achieved.

The above describes a number of examples of methods, apparatus and systems for tracking a position of an object, which are particularly beneficial in maintaining sufficient position accuracy.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described. Thus, for example, it will be appreciated that features from different examples above may be used interchangeably where appropriate.

The claims defining the invention are as follows:

1. A portable position tracking apparatus including:
   a) a power supply;
   b) a position sensor that receives position signals and uses the position signals to determine an absolute position of the apparatus;
   c) a trigger sensor that generates a trigger signal in response to detection of a trigger event;
   d) a memory storing a plurality of sampling strategies; and,
   e) an electronic processing device in communication with the power supply, the memory, the position sensor and the trigger sensor that repeatedly:
      i) monitors the trigger sensor for the trigger signal;
      ii) determines if the trigger event has occurred in response to receiving the trigger signal from the trigger sensor; and
      iii) if the trigger event has occurred, then:
         (1) monitors the power supply to determine an available power;

(2) uses the available power and an estimated trip duration obtained using historical position tracking data to select a sampling strategy from the plurality of sampling strategies;

(3) uses the selected sampling strategy to determine if an absolute position should be sampled;

(4) if the absolute position should be sampled, then controls operation of the position sensor to thereby determine the absolute position; and, (5) stores an indication of a position of the apparatus in the memory in accordance with the absolute position.

2. Apparatus according to claim 1, wherein at least one of:
a) the trigger includes at least one of:
  i) a threshold is exceeded;
  ii) a change in movement of the apparatus;
  iii) a change in a temperature;
  iv) a change in a pressure;
  v) a change in a humidity;
  vi) a change in an illumination;
  vii) a change in a proximity of the apparatus to an object; and
  viii) a change in a sound; and,
b) the trigger sensor includes at least one of:
  i) a motion sensor;
  ii) a gyroscope;
  iii) an accelerometer;
  iv) a magnetometer;
  v) a thermometer;
  vi) a barometer;
  vii) a hygrometer;
  viii) a photodetector;
  ix) a proximity sensor; and,
  x) a microphone.

3. The apparatus according to claim 1, wherein the electronic processing device:
a) detects movement of the apparatus using a motion sensor;
b) determines a relative position of the apparatus based on movement of the apparatus from the most recent absolute position; and,
c) stores an indication of the relative position.

4. The apparatus according to claim 1, wherein the sampling strategy includes at least one of:
  i) an inertial based strategy;
  ii) an inertial and time based strategy; and,
  iii) an error based strategy.

5. The apparatus according to claim 1, wherein the electronic processing device:
a) compares movement to movement criteria, wherein the movement criteria include at least one of if:
  i) the apparatus changes from a stationary to a moving state;
  ii) a cumulative heading change exceeds a defined heading change threshold; and,
  iii) an orthogonal distance exceeds an orthogonal distance threshold; and,
b) determines the absolute position from the position sensor in accordance with the results of the comparison.

6. The apparatus according to claim 1, wherein the electronic processing device:
a) uses movement to determine a potential error;
b) compares the potential error to an error threshold; and,
c) controls the position sensor in accordance with the result of the comparison.

7. The apparatus according to claim 1, wherein the electronic processing device:
a) monitors at least one of power usage and trip complexity;
b) estimates a power consumption;
c) determines if expectations are exceeded by comparing the power consumption to the available power; and,
d) revises a sampling strategy in response to a successful determination.

8. The apparatus according to claim 1, wherein the electronic processing device:
a) compares an elapsed time since the absolute position was previously determined to an elapsed time threshold; and,
b) determines the absolute position from the position sensor in accordance with the results of the comparison.

9. The apparatus according to claim 1, wherein the electronic processing device at least one of:
a) sets a threshold based on the available power; and,
b) determines available power at least partially in accordance with a power supply input and power supply output.

10. The apparatus according to claim 1, wherein the power supply at least one of:
a) has an input coupled to a power generator that generates electrical power from external energy sources;
b) has an input coupled to a power generator that generates electrical power from external energy sources, the external energy sources include at least one of:
  i) movement of the apparatus; and,
  ii) solar power; and
c) includes a battery and wherein the electronic processing device determines the available power at least partially in accordance with a battery charge level.

11. The apparatus according to claim 1, wherein the electronic processing device controls the position sensor at least partially in accordance with a schedule stored in a memory.

12. The apparatus according to claim 11, wherein the schedule is at least one of:
a) based upon previous measurements of at least one of movement and power usage;
b) a movement schedule indicative of an expected duration of movement; and,
c) a power schedule indicative of an expected available power;
d) remotely updated;
e) at least partially indicative of at least one of:
  i) expected power generation; and,
  ii) expected power usage.

13. The apparatus according to claim 1, wherein at least one of:
a) the electronic processing device controls the position sensor to cause the absolute position to be determined at a predetermined frequency; and,
b) the position sensor includes a GPS system.

14. The apparatus according to claim 1, wherein the apparatus includes a transceiver that communicates with one or more communication nodes to provide position information indicative of one or more positions of the apparatus.

15. A method for tracking a position of an object, the method including, in an electronic processing device of a position tracking apparatus attached to the object, repeatedly:

i) monitoring a trigger sensor for a trigger signal;
ii) determining if a trigger event has occurred in response to receiving the trigger signal from the trigger sensor; and
iii) if the trigger event has occurred, then:
  (1) monitoring a power supply to determine an available power;
  (2) using the available power and an estimated trip duration obtained using historical position tracking data to select a sampling strategy from a plurality of sampling strategies;
  (3) using the selected sampling strategy to determine if an absolute position should be sampled;
  (4) if the absolute position should be sampled, controlling operation of a position sensor to thereby determine an absolute position; and,
  (5) storing an indication of a position of the apparatus in a memory in accordance with the absolute position.

16. The method according to claim 15, wherein the method includes:
  a) detecting movement of the object using a motion sensor; and,
  b) estimating trip duration using historical position tracking data.

17. The method according to claim 15, wherein the method includes:
  a) using the movement to determine a potential error;
  b) comparing the potential error to an error threshold; and,
  c) controlling the position sensor in accordance with the result of the comparison.

18. The method according to claim 15, wherein the method includes controlling the position sensor at least partially in accordance with a schedule store in the memory and wherein the schedule is based upon previous measurements of at least one of movement and power usage.

* * * * *